(12) United States Patent
Sauerwein, Jr. et al.

(10) Patent No.: US 8,281,993 B2
(45) Date of Patent: Oct. 9, 2012

(54) DATA COLLECTION DEVICE AND NETWORK HAVING RADIO SIGNAL RESPONSIVE OPERATION

(75) Inventors: James T. Sauerwein, Jr., Charlotte, NC (US); William H. Havens, Syracuse, NY (US); Sven M. A. Powilleit, Charlotte, NC (US); Brian Roman Dobeck, Monroe, NC (US); Adam Edward Meggitt, Charlotte, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 13/444,000

(22) Filed: Apr. 11, 2012

(65) Prior Publication Data

US 2012/0205437 A1   Aug. 16, 2012

Related U.S. Application Data

(62) Division of application No. 12/775,154, filed on May 6, 2010, now Pat. No. 8,157,168, which is a division of application No. 11/370,189, filed on Mar. 6, 2006, now Pat. No. 7,712,670.

(60) Provisional application No. 60/721,518, filed on Sep. 28, 2005.

(51) Int. Cl.
*G07B 15/02* (2011.01)

(52) U.S. Cl. ..................................................... 235/384

(58) Field of Classification Search .................. 235/383, 235/384, 385, 462.46, 472.01–472.03
See application file for complete search history.

(56) References Cited

U.S. PATENT DOCUMENTS

| | | |
|---|---|---|
| 4,973,952 A | 11/1990 | Malec et al. |
| 5,239,669 A | 8/1993 | Mason et al. |
| 5,406,491 A | 4/1995 | Lima |
| 5,565,858 A | 10/1996 | Guthrie |
| 5,596,652 A | 1/1997 | Piatek et al. |
| 5,648,770 A | 7/1997 | Ross |
| 5,699,244 A | 12/1997 | Clark, Jr. et al. |
| 5,828,322 A | 10/1998 | Eberhard |
| 5,873,070 A | 2/1999 | Bunte et al. |
| 5,902,347 A | 5/1999 | Backman et al. |
| 5,910,799 A | 6/1999 | Carpenter et al. |
| 5,938,721 A | 8/1999 | Dussell et al. |
| 5,977,908 A | 11/1999 | Nichols |
| 6,067,045 A | 5/2000 | Castelloe et al. |
| 6,067,046 A | 5/2000 | Nichols |
| 6,078,251 A | 6/2000 | Landt et al. |
| 6,101,483 A | 8/2000 | Petrovich et al. |
| 6,132,391 A | 10/2000 | Onari et al. |
| 6,142,372 A | 11/2000 | Wright |
| 6,199,044 B1 | 3/2001 | Ackley et al. |
| 6,201,498 B1 | 3/2001 | Fan |

(Continued)

FOREIGN PATENT DOCUMENTS

JP      2006292611 A   * 10/2006

*Primary Examiner* — Seung Lee
(74) *Attorney, Agent, or Firm* — Heslin, Rothenberg, Farley & Mesiti, PC

(57) ABSTRACT

A data collection device can include at least one of a bar code reader unit, an RFID reader unit, and a card reader unit. A data collection device can be operative to receive and process radio signals. A data collection device can be configured so that operation of the data collection device is responsive to radio signals.

15 Claims, 17 Drawing Sheets

U.S. PATENT DOCUMENTS

| | | |
|---|---|---|
| 6,226,622 B1 | 5/2001 | Dabbiere |
| 6,311,896 B1 | 11/2001 | Mulla et al. |
| 6,394,354 B1 | 5/2002 | Wilz, Sr. et al. |
| 6,411,891 B1 | 6/2002 | Jones |
| 6,411,899 B2 | 6/2002 | Dussell et al. |
| 6,422,466 B1 | 7/2002 | Dickson et al. |
| 6,433,732 B1 | 8/2002 | Dutta et al. |
| 6,456,938 B1 | 9/2002 | Barnard |
| 6,496,775 B2 | 12/2002 | McDonald, Jr. et al. |
| 6,510,376 B2 | 1/2003 | Burnstein et al. |
| 6,532,152 B1 | 3/2003 | White et al. |
| 6,535,199 B1 | 3/2003 | Canova, Jr. et al. |
| 6,556,553 B1 | 4/2003 | Palmer et al. |
| 6,614,392 B2 | 9/2003 | Howard |
| 6,629,642 B1 | 10/2003 | Swartz et al. |
| 6,693,586 B1 | 2/2004 | Walters et al. |
| 6,701,231 B1 | 3/2004 | Borugian |
| 6,701,234 B1 | 3/2004 | Vogelsang |
| 6,747,692 B2 | 6/2004 | Patel et al. |
| 6,748,320 B2 | 6/2004 | Jones |
| 6,798,378 B1 | 9/2004 | Walters |
| 6,804,606 B2 | 10/2004 | Jones |
| 6,816,112 B1 | 11/2004 | Chethik |
| 6,837,436 B2 | 1/2005 | Swartz et al. |
| 6,844,846 B1 | 1/2005 | Riday |
| 6,879,836 B2 | 4/2005 | Nakamoto et al. |
| 6,889,139 B2 | 5/2005 | Prabhakaran |
| 6,937,985 B2 | 8/2005 | Kuma et al. |
| 7,003,316 B1 | 2/2006 | Elias et al. |
| 7,016,899 B1 | 3/2006 | Stern et al. |
| 7,034,747 B1 | 4/2006 | Walters et al. |
| 7,040,541 B2 | 5/2006 | Swartz et al. |
| 7,092,009 B2 | 8/2006 | Patel et al. |
| 7,118,032 B2 | 10/2006 | Elliot et al. |
| 7,120,462 B2 | 10/2006 | Kumar |
| 7,147,163 B2 | 12/2006 | Salvato et al. |
| 7,155,405 B2 | 12/2006 | Petrovich |
| 7,180,427 B2 | 2/2007 | Meyer et al. |
| 7,184,972 B2 | 2/2007 | Flaherty |
| 7,198,192 B2 | 4/2007 | Page et al. |
| 2005/0035208 A1* | 2/2005 | Elliot et al. ............... 235/472.01 |
| 2006/0030338 A1 | 2/2006 | Harken et al. |

* cited by examiner

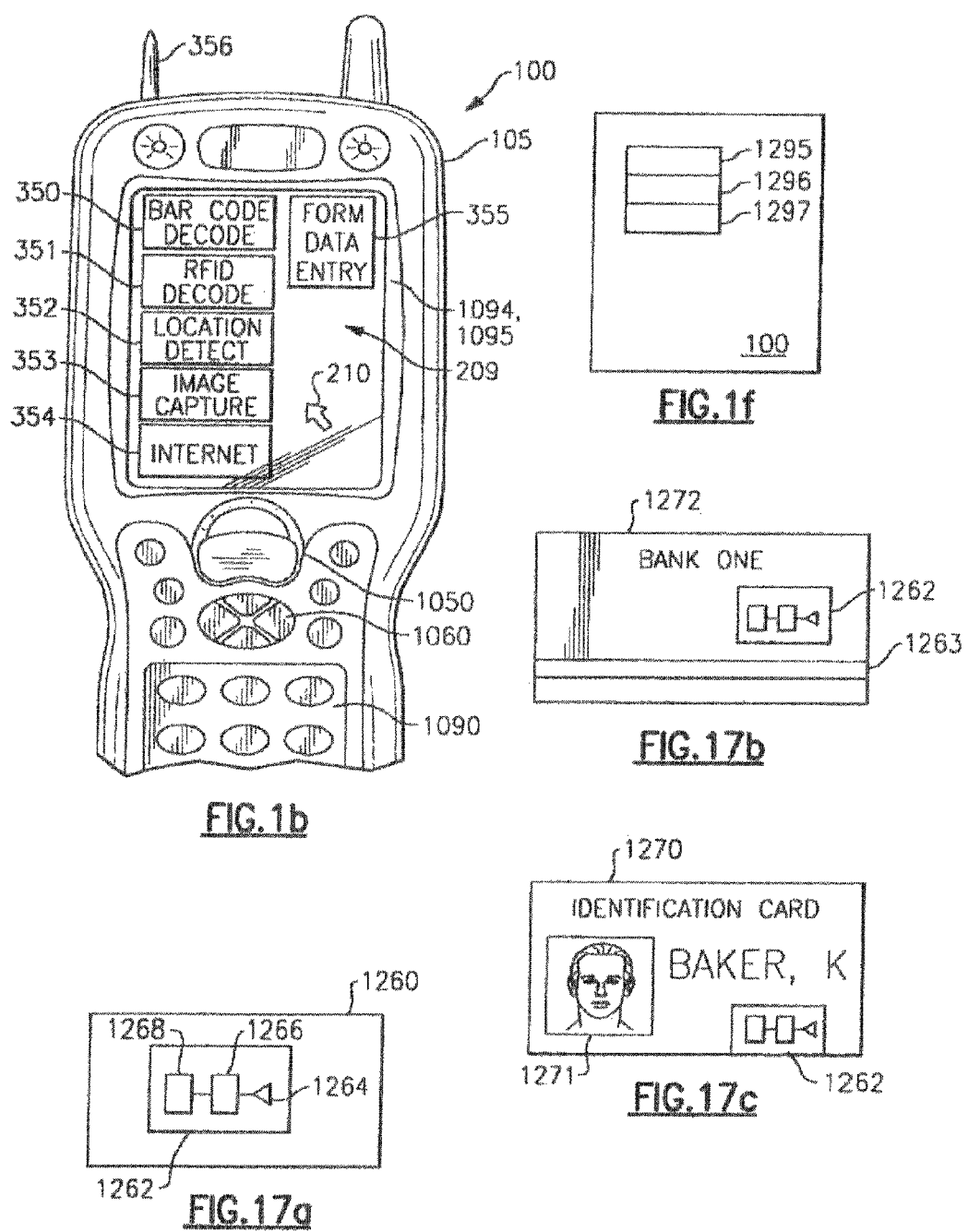

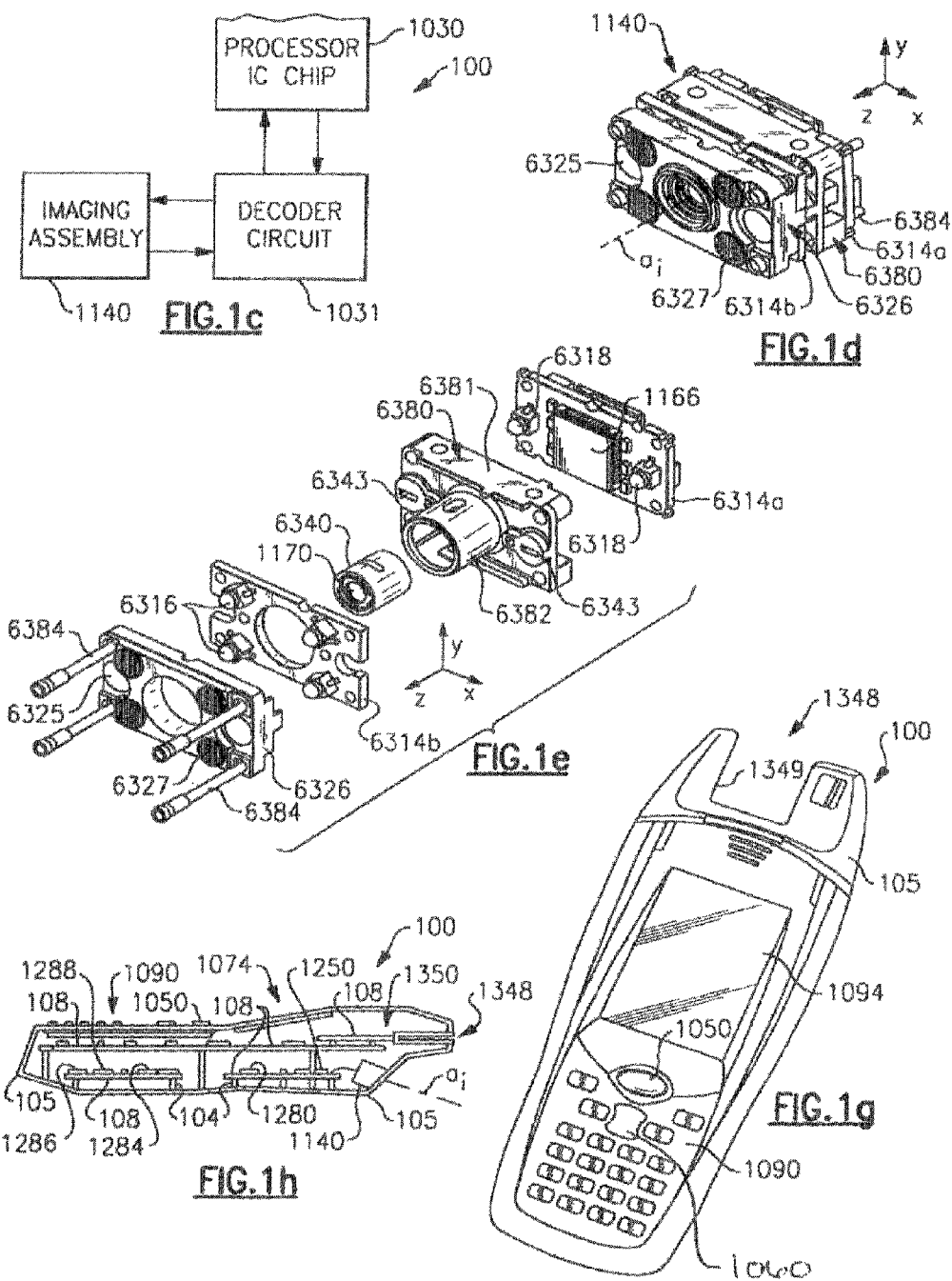

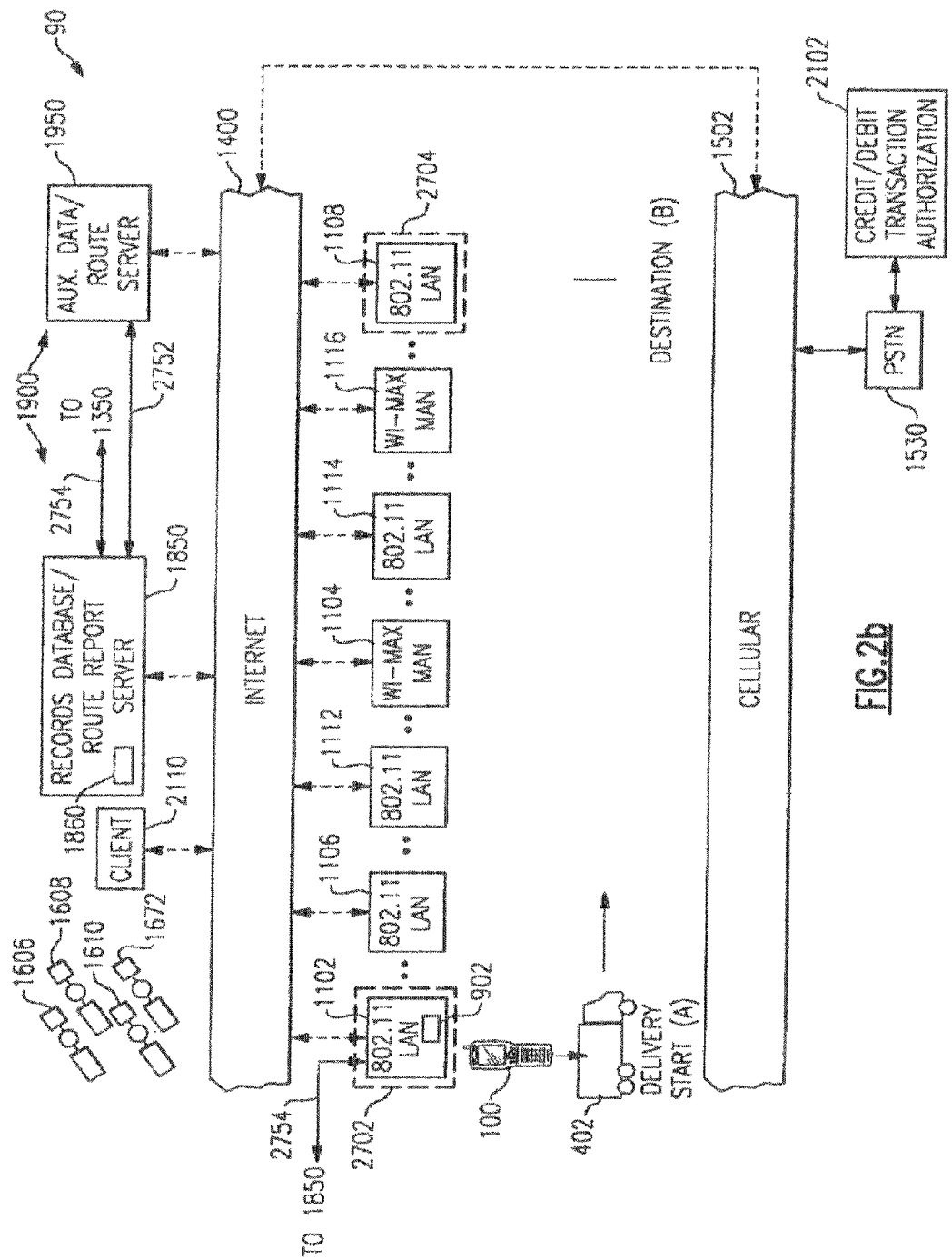

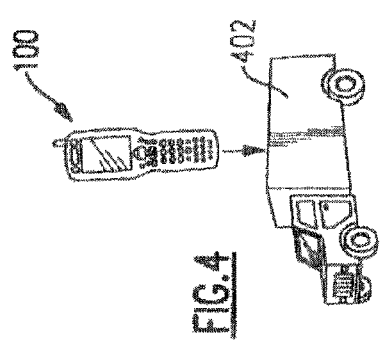
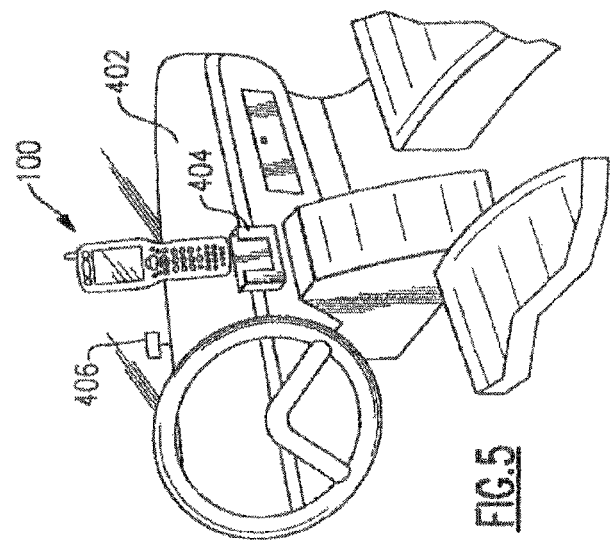
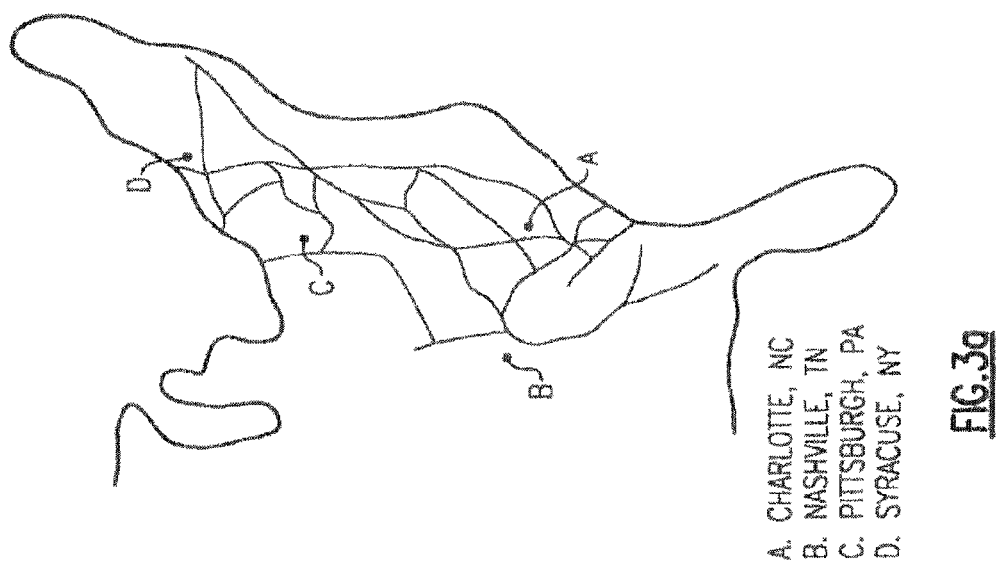

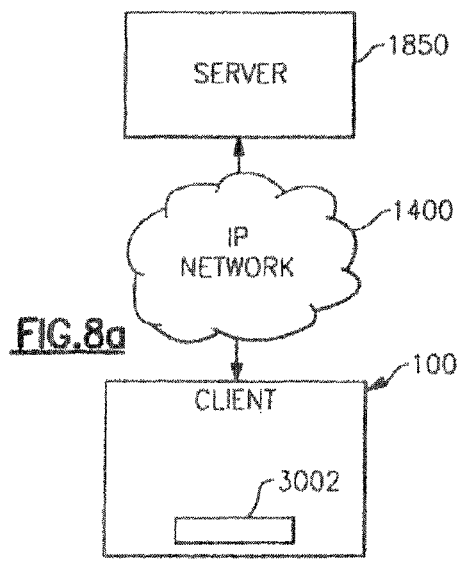
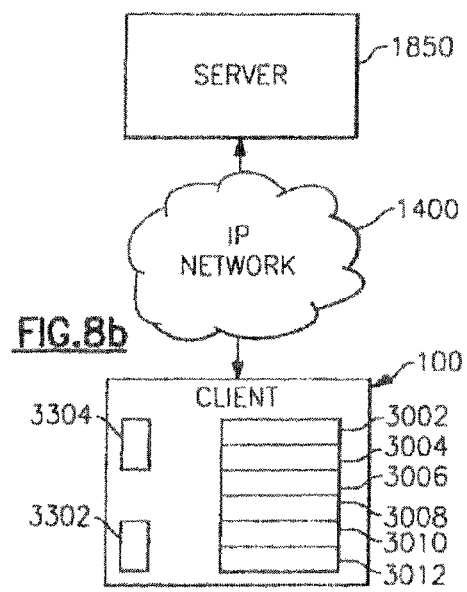
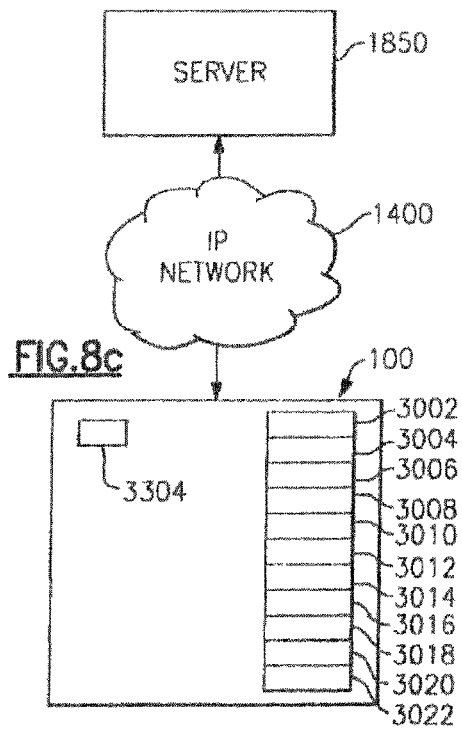
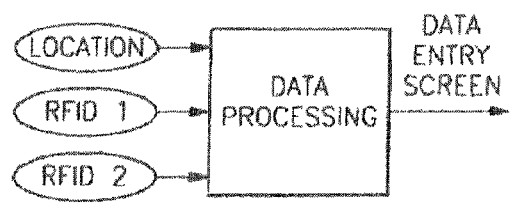

| LOCATION | FORM SET |
|---|---|
| 562 WASHINGTON PARKWAY | A 3002 |
| 55 MAPLE STREET | B 3004 |
| 180 WALNUT STREET | D 3006 |

| LOCATION | PERSON ID | TRUCK ID | FORM SET |
|---|---|---|---|
| 562 WASHINGTON PARKWAY | AIKEN, B | FORD | A 3002 |
| 562 WASHINGTON PARKWAY | AIKEN, B | CHRYSLER | A 3002 |
| 562 WASHINGTON PARKWAY | BAKER, K | FORD | A 3002 |
| 562 WASHINGTON PARKWAY | BAKER, K | CHRYSLER | A 3002 |
| 150 WASHINGTON PARKWAY | AIKEN, B | FORD | A 3002 |
| 150 WASHINGTON PARKWAY | AIKEN, B | CHRYSLER | A 3002 |
| 150 WASHINGTON PARKWAY | BAKER, K | FORD | NO FORM SET |
| 150 WASHINGTON PARKWAY | BAKER, K | CHRYSLER | NO FORM SET |
| 55 MAPLE STREET | AIKEN, B | FORD | B 3004 |
| 55 MAPLE STREET | AIKEN, B | CHRYSLER | B 3004 |
| 55 MAPLE STREET | BAKER, K | FORD | C 3006 |
| 55 MAPLE STREET | BAKER, K | CHRYSLER | C 3006 |
| 180 WALNUT STREET | AIKEN, B | FORD | D 3008 |
| 180 WALNUT STREET | AIKEN, B | CHRYSLER | E 3010 |
| 180 WALNUT STREET | BAKER, K | FORD | F 3012 |
| 180 WALNUT STREET | BAKER, K | CHRYSLER | G 3014 |
| 101 MAIN STREET | AIKEN, B | FORD | H 3016 |
| 101 MAIN STREET | AIKEN, B | CHRYSLER | I 3018 |
| 101 MAIN STREET | BAKER, K | FORD | J 3020 |
| 101 MAIN STREET | BAKER, K | CHRYSLER | K 3022 |

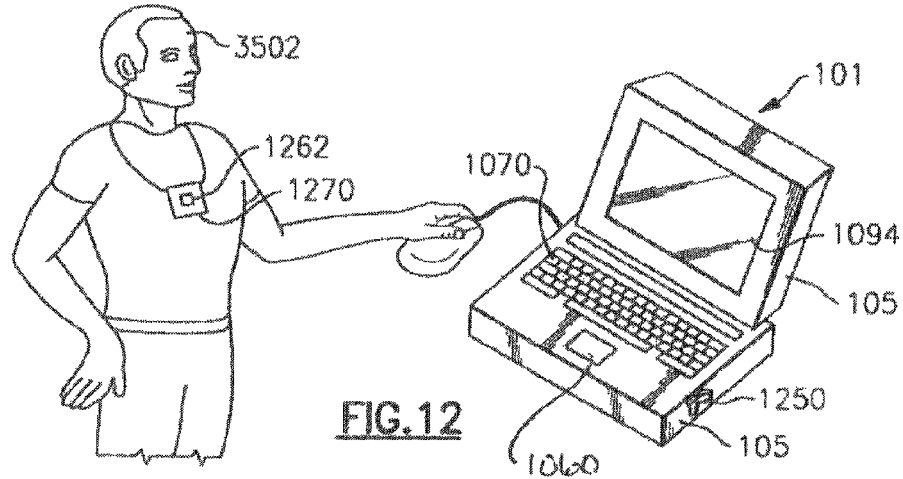

FIG. 12

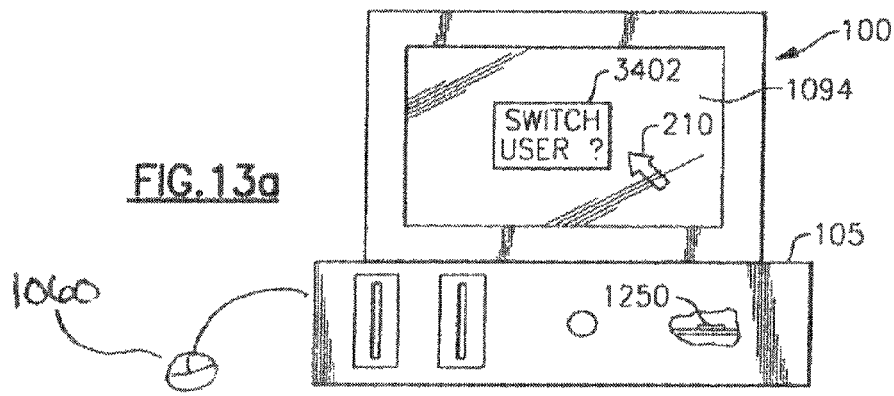

```
[000100]
Sample XML Code
<delivery_record>
<image_data>image</image_data>
<parcel_id>0123456</parcel_id>
<delivery_address>
    <name>
    <title>Dr. </title>
    <last_name>Jones</last_name>
    <first_name>Bobby</first_name>
    </name>
    <street>700 Visions Drive</street>
    <city>Anywhere</city>
    <state>NY</state>
    <zip>01234</zip>
</delivery_address>
<uct_delivery_time>18:55:03</uct_delivery_time>
<delivery_record>
```

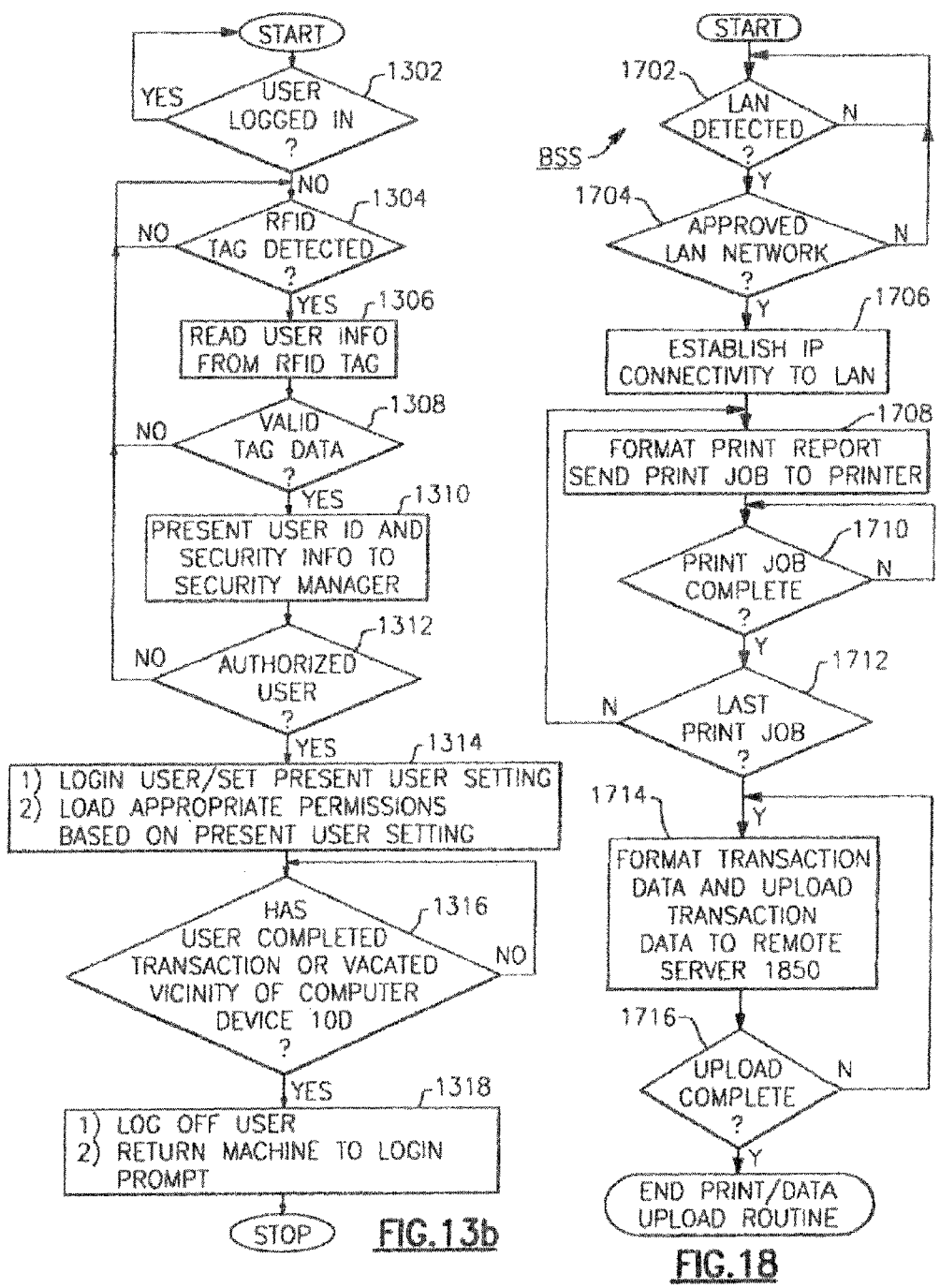

FIG. 13c

| EMPLOYEE CODE | EMPLOYEE | EMPLOYEE CLASSIFICATION |
|---|---|---|
| XYM24 | ADAMS | NURSE |
| PXZ19 | BLAKE | DOCTOR |
| MYZ20 | COLE | DOCTOR |
| MXN66 | DOUGLAS | IT |
| YY842 | EVANS | IT |
| YXX011 | FOSTER | NURSE |

FIG. 13d

| EMPLOYEE CLASSIFICATION | "PRESENT USER" SETTING | APPLICATION(S) DRIVEN ACTIVE (AUTOMATICALLY EXECUTED) |
|---|---|---|
| DOCTOR | DOCTOR USERS | (1) INTERNET EXPLORER TO OPEN WEBPAGE OF PRESCRIPTION DRUG SUPPLIER<br>(2) DATABASE APPLICATION (SOFTAID EMR SOFTWARE) |
| NURSE | NURSE USERS | DATABASE APPLICATION (SOFTAID EMR SOFTWARE) |
| IT | IT USERS | IT MANAGEMENT APPLICATION (LDOMCLIENT.EXE) |

DATA COLLECTION DEVICE AND NETWORK HAVING RADIO SIGNAL RESPONSIVE OPERATION

CROSS REFERENCE TO RELATED APPLICATIONS

This application is a divisional application of U.S. patent application Ser. No. 12/775,154 filed May 6, 2010 entitled "Data Collection Device and Network Having Radio Signal Responsive Operation", which is a divisional of U.S. patent application Ser. No. 11/370,189, filed Mar. 6, 2006 entitled "Data Collection Device And Network Having Radio Signal Responsive Mode Switching" (now U.S. Patent Publication No. 2007/0069030). U.S. patent application Ser. No. 11/370, 189 claims priority under 35 U.S.C. §119(e) of U.S. Provisional Application No. 60/721,518, filed Sep. 28, 2005 entitled "Data Collection Device and Network Having Radio Signal Responsive Mode Switching" (now expired). Priority of each of the above applications is claimed and the disclosure of each of the above applications is incorporated herein by reference in its entirety.

FIELD OF THE INVENTION

The invention relates to data collection devices in general and specifically to data management methods and apparatus for use in data collection networks.

BACKGROUND OF THE PRIOR ART

In recent years significant advances have been made in the art of data collection devices and networks containing the same.

In U.S. Pat. No. 5,900,613, a data collection device system is described having a data collection device adapted to read bar code data wherein the data collection device is in communication with a local host processor and a remote host processor. The data collection device of U.S. Pat. No. 5,900, 613 is configured to report bar code data to a remote computer and execute reprogramming routines to receive program data either or both from the remote host processor and the local host processor.

In U.S. Pat. No. 6,298,176, a data collection device system is described having a bar code reading device and a host computer. The bar code reading device is equipped to send bar code data and associated image data to the host. The image data may contain digital images associated with transmitted bar code data. In one example described in U.S. Pat. No. 6,298,176, image data sent to a host includes image data representing a handwritten signature.

In U.S. Publication No. US2002/0171745, a data collection device system is described having a bar code reading device which is in communication with a remote computer. The bar code reading device sends image data and associated bar code data to the remote computer. In one combined bar code/image data transmission scheme described in U.S. Publication No. US2002/0171745, an image data file in .PDF, .TIFF, or .BMP file format is created at a data collection device which includes an image representation of a decoded bar code message and an image representation of the package including the bar code encoding the decoded message.

In U.S. Publication No. US2003/0132292, a data collection device is described having a data collection terminal including a bar code reading unit, an RFID reading unit, a mag stripe data reading unit, a chip card reading unit, and a fingerprint reading unit. The terminal is part of a data collection system, which is configured to facilitate financial transactions involving data collected utilizing the various reading units.

As significant as the above developments are, shortcomings have been noted with the operation of presently available data collection devices. For example, with the increase of features available in data collection devices, operators of such devices are finding it difficult to remain informed as to the full range of functions available with the devices they use. As a result, operators of sophisticated data collection devices expend significant resources in attempts to learn of additional functions available with the device that they use.

Accordingly, there is a need for further advances in data collection devices and networks in which they are connected, and management of data collected utilizing such networks.

SUMMARY OF THE INVENTION

A data collection device can include at least one of a bar code reader unit, an RFID reader unit, and a card reader unit. A data collection device can be operative to receive and process radio signals. A data collection device can be configured so that operation of the data collection device is responsive to radio signals.

BRIEF DESCRIPTION OF THE DRAWINGS

For a further understanding of these and other objects of the invention, reference will be made to the following detailed description of the invention which is to be read in connection with the accompanying drawing, where:

FIG. 1b is a physical view of a mobile data collection device according to the invention with GUI menu selection functionality;

FIG. 1c is a partial view of an alternative embodiment of the electrical circuit shown and described in FIG. 1a;

FIG. 1d is a front perspective view an assembled imaging module which may be incorporated in a data collection device according to the invention;

FIG. 1e is an exploded assembly view of the imaging module shown in FIG. 1d;

FIG. 1f is a software architecture diagram illustrating various software modules that can be incorporated in a data collection device according to the invention enabling a data collection device to receive and output location information for reading by the data collection device in future processing;

FIG. 1g is a top unit of a data collection device according to the invention including an imaging module, an RFID reader unit, and a card reader unit;

FIG. 1h is a cutaway side view of the data collection device shown in FIG. 1f incorporated in a hand held housing;

FIG. 2b is an alternative network schematic view of a data collection system according to the invention;

FIGS. 3a and 3b illustrate examples of delivery routes according to the invention;

FIGS. 4 and 5 illustrate an incorporation of a mobile data collection device according to the invention within a vehicle;

FIGS. 8a, 8b, and 8c are network schematic views of embodiments of the invention having enhanced data entry screen display functionality;

FIGS. 9 and 10 are alternative lookup tables which may be utilized with the invention for selecting between data entry forms;

FIG. 11 is an exemplary transfer function which may be executed by a system according to the invention for the formatting of a data entry screen displayed on display of a mobile data collection device according to the invention;

FIG. 12 is a plan view of an embodiment of the invention implemented on computer device having a multiple user operating system;

FIG. 13a is a view of display of the computer shown in FIG. 12 displaying a switch user control button;

FIG. 13b is a flow diagram illustrating operation of a data collection device according to the invention wherein, the data collection device is configured to monitor an output of a RFID reader unit of the data collection device in order to determine such information as whether a new user is in the vicinity of the data collection device;

FIGS. 13c and 13d are exemplary look up tables which can be incorporated in a system according to the invention for use in embodiments of the invention wherein a data collection device monitors an output of a RFID reader unit thereof to determine an operating mode of the data collection device;

FIGS. 17a, 17b, and 17c illustrate examples of RFID tag bearing members which may be utilized with the invention;

FIG. 18 is a flow diagram illustrating operation of data collection device according to the invention which is configured to automatically print route report data and/or upload route report data when returning to a supplier LAN;

FIG. 19 shows an exemplary XML document that can be uploaded by a data collection device according to the invention to a remote server;

These and other details and advantages will become apparent from the detailed description of the preferred embodiment herein below.

DETAILED DESCRIPTION OF THE INVENTION

According to its major aspects and broadly stated, the invention is a data collection device having a data input front end comprising of at least one of a bar code reader unit (circuit), an RFID reader unit (circuit), or a financial transaction card reader unit (circuit).

In one aspect, the data collection device is configured so that the device receives and processes various radio signals and automatically changes an operating mode of the data collection device in response to the radio signals or in response to the presence or absence of the radio signals without any manual controls being input to the data collection device. By configuring the data collection device to automatically change an operating mode in response to a sensing of radio signals, operating modes are presented to an operator that may be tailored to the preferences of the present operator and/or tailored to the particular requirements of the device at a present location of the device. With highly featurized operating modes being automatically and selectively presented to operators under specific circumstances, an operator is relieved of the variety of burdensome and time consuming exercises such as practice use of the device, attending training seminars, and studying manuals that are typically associated with learning how to access particular functions of highly featurized electronic devices.

In a particular embodiment of the invention, a location enabled data collection device is specifically adapted for use in an article delivery application. The device is programmed so that when a delivery destination is arrived at, the device establishes a pointer to a particular form set depending on the particular delivery location arrived at and automatically executes the form set to display a data entry screen sequence that is customized to the needs of the business entity located at the delivery destination.

Figure 1A:
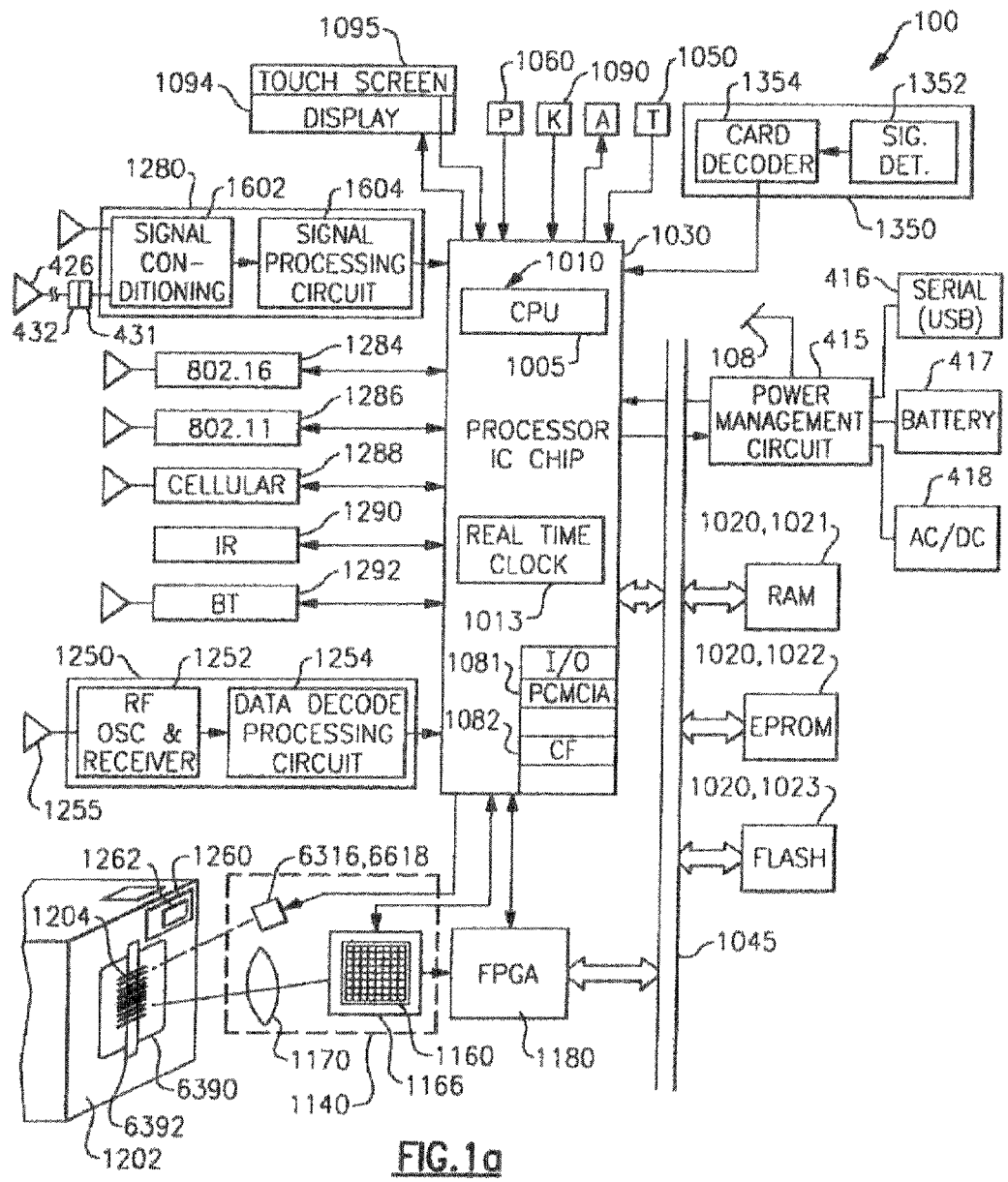
FIG. 1a is a block diagram of a mobile data collection device according to the invention.

A block diagram of device 100 according to the invention is shown in FIG. 1a. By operation of a control circuit 1010, device 100 receives and processes various input such as location information data and transaction data, and controls various output such as the output of various collected transaction data. In the embodiment of FIG. 1a, control circuit 1010 includes a central processing unit or CPU 1005. CPU 1005 may be disposed on processor IC chip 1030, while memory 1020 may be incorporated partially in IC chip 1030 and partially in a plurality of memory IC chips such as EPROM IC chip 1022, RAM IC chip 1021, and flash IC chip 1023. EPROM IC chip 1022, RAM IC chip 1021, and flash IC chip 1023 or other nonvolatile storage device may be in communication with microprocessor IC chip 1005 via system bus 1045. Processor IC chip 1030 operates in accordance with an Operating System(OS) which is typically loaded into RAM 1021 when data collection device 100 is booted up. The device's operating system enables processor IC chip 1030 to recognize input from user input interface components, e.g., keyboard 1090, send output to output interfaces e.g., display 1094, schedule tasks, manage files, and directories and control other components such as input/output devices. Examples of suitable operating systems for device 100 include WINDOWS XP, LINUX, WINDOWS CE, OSX.

Referring to further elements of device 100, device 100 includes a display 1094. Display 1094 may have an associated touch screen overlay 1095 so that display 1094 operates as a data input interface. The combination of display 1094 and touch screen overlay 1095 can be regarded as a "touch screen." Device 100 may further have a keyboard 1090 enabling input of data. Device 100 may also include a graphical user interface ("GUI") as illustrated in FIG. 1b. GUI 209 includes a pointer 210. Pointer 210 is moved by an operator to select between various displayed (sometimes referred to as "virtual") control buttons displayed on display 1095. Pointer 210 may be moved during web browsing to select a text or icon hyperlink for highlighting. Control buttons may also be displayed for selecting between various menu options. Device 100 can be configured so that displayed menu options are selected by physically depressing a displayed icon or text, with use of a finger or stylus 505 (FIG. 1h). As shown in FIG. 1b, the control buttons may be a series of icons 350, 351, 352, 353, and 354. Selecting one of the icons changes the mode of operation of the device in accordance with the selected icon. Device 100 includes a pointer controller 1060 enabling movement of pointer 210. In the specific embodiments of FIGS. 1b and 1g, pointer controller 1060 is provided by an arrow navigation matrix. Pointer controller 1060 may also be provided by, e.g., a trackball (FIG. 12), mouse (FIG. 13a), or a joystick. Device 100 further includes a trigger 1050 for controlling various data input units of device 100. Trigger 1050 is in communication with control circuit 1010.

Device 100 as shown in FIG. 1a also includes an image signal generating system provided by two dimensional solid state image sensor 1160, available in such technologies as CCD, CMOS, and CID. Two-dimensional solid state image sensors generally have a plurality of photosensor picture elements ("pixels") which are formed in a pattern including a plurality of rows and a plurality of columns of pixels. Device 100 further includes an imaging optics 1170 focusing an image onto an active surface of image sensor 1160. Image sensor 1160 may be incorporated on an image sensor IC chip 1166 having disposed thereon image sensor control circuitry, image signal conditioning circuitry, and an analog-to-digital converter. Device 100 may further include a field programmable gate array 1180 ("FPGA"). Operating under the control of control circuit 1010, FPGA 1180 manages the capture of image data into RAM 1021.

When trigger button 1050 is actuated with device 100 in a bar code decode mode of operation, control circuit 1010 automatically sends appropriate control signals to image sensor chip 1166. Image sensor chip 1166 in response thereto automatically exposes photosensitive pixels of image sensor 1160 to light and generates image signals. The image signals are thereafter automatically converted into digital values by image sensor IC chip 1166. The digital values are received by FPGA 1180 and transferred into RAM 1021 to capture an electronic image representation of a substrate 1202 carrying a bar code symbol 1204. In accordance with a bar code decoding program stored in ROM 1022, control circuit 1010 may attempt to decode a bar code symbol represented in the captured electronic image representation. The capture of image data and decoding of image data occur automatically in response to a trigger signal being generated. A trigger signal can be generated when trigger 1050 is actuated. Control circuit 1010 may be configured to continuously capture image data and attempt to decode bar code symbols represented therein as long as trigger 1050 is actuated. The electronic image representation captured into RAM 1021 may be an image map having a pixel value (gray scale, color scale) for each pixel of the image sensor.

In addition to having a decode mode of operation, device 100 may also be configured to include an image capture mode of operation. In an image capture mode of operation, control circuit 1010 captures an electronic image representation in response to trigger button 1050 being actuated without attempting to decode a decodable symbol represented therein. The captured electronic image representation may be one or more of (i) stored into a designated memory location of memory 1020, (ii) transmitted to an external spaced apart device (e.g., device 1310, 1350, 1810, and 1850) automatically or in response to a user input command, or (iii) displayed on display 1094 automatically or in response to a user input command.

Imaging assembly 1140, which in the embodiment described thus far includes an image sensor chip 1166 and imaging optics 1170, may be provided by an IT4XXX image engine of the type available from Hand Held Products, Inc., of Skaneateles Falls, N.Y. Imaging assembly 1140 may also be an IMAGETEAM IT4x10/4x80 imaging module of the type available from Hand Held Products. Views of an IT4x10/4x80 imaging module are shown in FIGS. 1d and 1e. Imaging module 1140 includes a first circuit board 6314a and a second circuit board 6314b. First circuit board 6314a carries an image sensor IC chip 1166 and aiming LEDs 6318. A support 6380 is fitted over first circuit board 6314a which has a retainer 6382 for carrying lens barrel 6340 which contains an imaging lens 1170. Support 6380 further carries slits 6343 for shaping light from LEDs 6318. With support 6380 mounted on first circuit board 6314a, second circuit board is fitted over support 6380. Second circuit board 6314b carries illumination LEDs 6316 and receives power via electrically conductive support posts 6384 that are in electrical communication with first circuit board 6314a. With second circuit board installed, optical plate 6326 is fitted over second circuit board 6314b. Optical plate 6326 carries a substantially uniform diffuser surface for diffusing light from illumination LEDs 6316 and lenses 6325 for imaging slits 6343 onto a substrate, e.g., substrate 1202 (FIG. 1a). Illumination LEDs 6316 together with the diffuser surface of optical plate 6326 projects an illumination pattern 6390 onto substrate 1202. Aiming LEDs 6318 together with slits 6343 and lenses 6325 project an aiming pattern 6392 onto a substrate 1202 as indicated in the view of FIG. 1a.

The above-mentioned IMAGETEAM IT4x10/4x80 imaging module (image engine) includes an associated decode circuit which decodes various 1D and 2D bar codes, OCR fonts, and which is equipped with various image capture modes of operation. Imaging assembly 1140 may also be provided by a laser scan engine, such as an SE2223 scan engine with decode circuit of the type available from Symbol Technologies, Inc., of Holtsville, N.Y. Referring to FIG. 1c, a block diagram of device 100 modified to include an IT4x10/4x80 or SE2223 decode circuit is shown. Decode circuit 1031 includes a dedicated processor IC chip and various decode memory structures for storing decoding programs and working image data. In the circuit of FIG. 1a, control circuit 1010, in response to receipt of a trigger signal, captures an image and decodes a bar code to produce a decoded out message. Decode circuit 1031 may decode such symbologies as PDF417, MicroPDF417, MaxiCode, Data Matrix, QR Code, Aztec, Aztec Mesa, Code 49, UCC Composite, Snowflake, Dataglyphs, Code 39, Code 128, Codabar, UPC/EAN, Interleaved 2 or 5, RSS, Code 93, Codablock, BC 412, Postnet (US), Planet Code, BPO 4 State, Canadian 4 State, Japanese Post, Kix (Dutch Post) and OCR-A, OCR-B. In the circuit of FIG. 1e, control circuit 1010, in response to receipt of a trigger signal, utilizes decode circuit 1031 to capture an electronic image representation and decode a bar code symbol represented therein to produce a decoded out message. A bar code decoding system in the embodiment of FIG. 1a includes control circuit 1010. In the embodiment of FIG. 1c, a bar code decoding system includes control circuit 1010 and decode circuit 1031.

In another aspect, device 100 as shown in FIG. 1a includes an RFID reader unit 1250. RFID reader unit 1250 includes an RF oscillation and receiver circuit 1252 and a data decode processing circuit 1254. RFID reader unit 1250 may be configured to read RF encoded data from a passive RFID tag, such as tag 1262, which may be disposed on article 1202. Where RFID reader unit 1250 is configured to read RF encoded data from a passive RFID tag 1262, RF oscillation and receiver circuit 1252 transmits a carrier signal from antenna 1255 to passive tag 1260. Passive RFID tag 1262 as shown in FIGS. 1*a* and 17*a* converts the carrier energy to voltage form and a transponder 1266 of tag 1260 is actuated to transmit a radio signal representing the encoded tag data. RF oscillator and receiver circuit 1252, in turn, receives the radio signal from the tag and converts the data into a processable digital format. Data decode processing circuit 1254, typically including a low cost microcontroller IC chip, decodes the received radio signal information received by RF oscillator and receiver circuit 1252 to decode the encoded identification data originally encoded into RFID tag 1262.

An RFID tag can be disposed on an RFID label 1260 as shown in FIG. 17*a* and FIG. 1*a*. RFID label 1260 includes a tag 1262 comprising an antenna 1264, a transponder 1266, and storage circuit 1268 for storing encoded identification data. Data from storage circuit 1268 is read from tag 1262 when tag 1262 is activated by RFID reader unit 1250. Further, reader unit 1250 may write data to tag 1262. Data written to tag 1262 by reader unit 1250 may be e.g., new identification data. Tag 1260 may be incorporated in physical structures of other article labels. As shown in FIG. 17*c*, tag 1262 may be incorporated on an identification card 1270, such as a driver license or an employee identification card. Identification card 1270 may carry a photograph 1271 of an employee. One specific type of employee identification card into which tag may be incorporated is a security badge. Tag 1262 may also be incorporated into a financial transaction card 1272 as shown in FIG. 17*b*, such as a credit card, a debit card, or an electronic benefits card. Financial transaction card 1272 may further include magnetic stripe 1263.

RFID reader unit 1250 may operate in a selective activation mode or in a continuous read operating mode. In a selective activation mode, RFID reader unit 1250 broadcasts radio signals in an attempt to activate a tag or tags in its vicinity in response to an RFID trigger signal being received. In a continuous read mode, RFID reader module 1250 continuously broadcasts radio signals in an attempt to actuate a tag or tags in proximity with unit automatically, without module 1250 receiving a trigger signal. In a selective activation mode, RFID reader unit 1250 selectively broadcasts radio signals in an attempt to activate a tag or tags in its vicinity selectively and automatically in response to a receipt by control circuit 1010 of an RFID trigger signal. Device 100 may be configured so that control circuit 1010 receives a trigger signal under numerous conditions, such as: (1) an RFID trigger button such as button 1050 is actuated; (2) an RFID trigger instruction is received from a spaced apart device such as remote processor 1850 (FIG. 2*a*), or local host processor 1350; and (3) control circuit 1010 determines that a predetermined condition has been satisfied.

Still further, device 100 may include a card reader unit 1350. Card reader unit 1350 includes a signal detection circuit 1352 and a data decode circuit 1354. Signal detection circuit 1352 receives an electrical signal from a card and data decode circuit 1354 decodes data encoded in the signal. When data decode circuit 1354 decodes a signal, the decode out information is transmitted to control circuit 1010 for further processing. Card reader unit 1350 forms part of a card reader 1348 which, in addition to including card reader unit 1350, includes a portion of housing 105 as shown in the embodiment of FIGS. 1*g* and 1*h*, and in the embodiment of FIGS. 1*i*, 1*j*, and 1*k*. Card reader 1348 includes card receiving slot 1349 defined by housing 105. Card reader unit 1350 is configured to read more than one type of card. Device 100, with use of card reader unit 1350, may read e.g., credit cards, customer loyalty cards, electronic benefits cards and identification cards such as employee identification cards and driver license cards. Card reader unit 1350 can be selected to be of a type that reads card information encoded in more than one data format. Where card reader unit 1350 is a Panasonic ZU-9A36CF4 Integrated Smart Reader, card reader unit 1350 reads any one of magnetic stripe data, smart card or Integrated circuit card (IC card) data, and RF transmitted data. Where card reader unit 1350 reads RF transmitted identification data via RFID reading capability thereof, card reader 1348 may read RF transmitted identification data from a card when a card is inserted into slot, or else card reader unit 1350 may read RF transmitted identification data from a card or another object (e.g., an RFID "key fob") when the card or object is merely brought into proximity with card reader 1348 without being inserted into slot 1349. Accordingly, where card reader unit 1350 is a Panasonic ZU-9A36CF4 Integrated Smart Reader, device 100 has dual RFID reader units; namely, RFID reader unit 1250 and the RFID reader unit incorporated in card reader unit 1350. An exemplary parts list for the circuit components of FIG. 1*a* is presented in Table 1.

TABLE 1

| Element | Model No. |
| --- | --- |
| Processor IC Chip | Intel PXA 255 |
| Location Detection Unit 1280 | Fastrax NPatch 100; Qualcomm MSM7600 chipset (supports gpsONE) |
| 802.11 Radio 1286 | Sychip WLAN 6065 |
| Cellular Radio 1288 | Siemens MC46; Qualcomm MSM7600 |
| Bluetooth Radio 1292 | Socketcom |
| RFID Reader 1250 | Skyetek Sky Module M1, Sky Module M8 |
| Card Reader 1350 | Panasonic ZU-9A36CF4 |
| Image Sensor Chip 1166 | Micron MT9V022 |

IC chip 1030 (FIG. 1*a*) may include a plurality of serial I/O interfaces such as general purpose I/O, USB, and Ethernet interfaces and a plurality of parallel interfaces such as Compact Flash (CF 1081) and PCMCIA (PC 1082).

The components of FIG. 1*a* can be supported entirely within a hand held housing 105 as seen in FIGS. 1*g* and 1*h*. Data collection device 100 may include a system of interior support members, e.g., members 104 extending from the interior walls of housing 105, for supporting a plurality of circuit boards 108, which, in turn, support various components of device 100, including integrated circuit components of device 100.

Figure 1I:
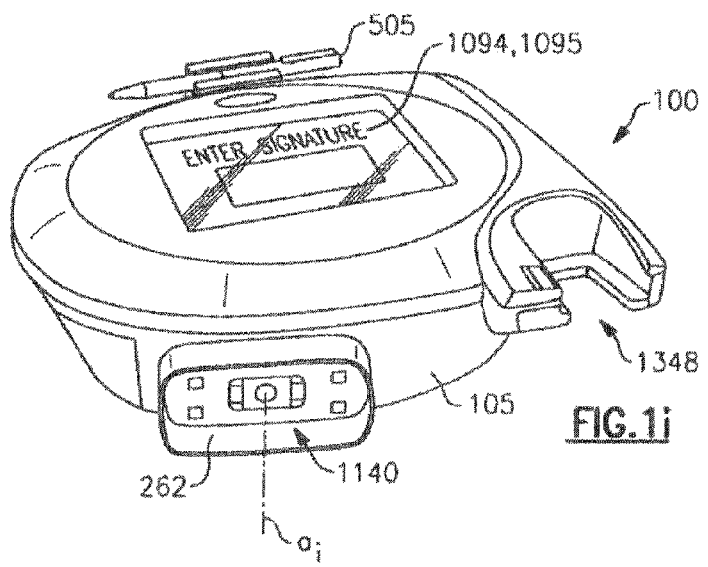
FIG. 1i is a front perspective view of a data collection device according to the invention incorporated in a portable and re-mountable housing and including an imaging module and a card reader.
Figure 1J:
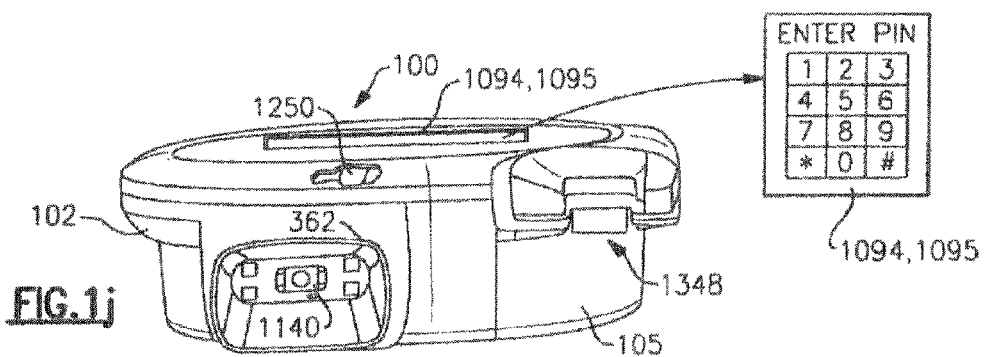
FIG. 1j is an alternative front perspective view of the portable and re-mountable transaction terminal data collection device according to the invention shown in FIG. 1h.
Figure 1K:
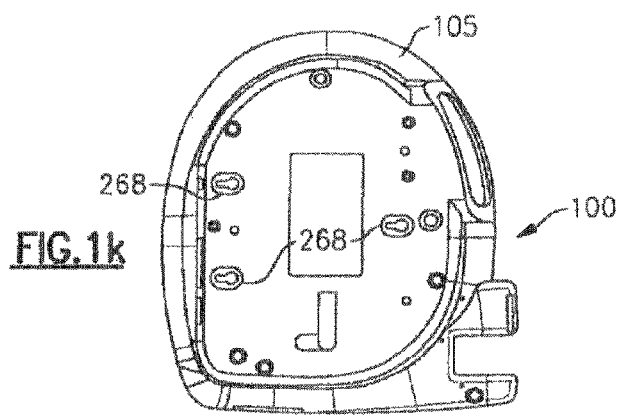
FIG. 1k is a bottom view of a data collection device according to the invention incorporated in a portable re-mountable housing as shown in FIGS. 1h and 1i.

In the embodiment of FIGS. 1*i*, 1*j*, and 1*k* data collection device 100 is in the form of a transaction terminal which may be configured as a retail purchase transaction terminal or as a price verifier. Housing 105 of the transaction terminal shown in FIGS. 1*i*, 1*j*, and 1*k* is configured to be portable so that it can be moved from location to location and is further configured to be replaceably mounted on a fixed structure such as a fixed structure of a cashier station or a fixed structure of the retail store floor (e.g., a shelf, a column). Components shown in FIG. 1*a* can be supported within housing 105 shown in FIGS. 1*i*-1*k*, 12 in the manner described with reference to FIG. 1*h*, i.e., on a support system including circuit boards and support members. Referring to bottom view of FIG. 1*k*, the housing 105 data collection device 100 has formations 268 facilitating the replaceable mounting of data collection device 100 on a fixed structure. Data collection device 100 includes a display 1094 having an associated touch screen overlay 1095, a card reader 1348 partially defined by card reader unit 1350 and partially defined by housing 105, and an imaging module 1140 having an imaging axis, $a_i$. Referring to further details of data collection device 100, data collection device 100 further includes a luminous shroud 362. When light from imaging module 1140 strikes luminous shroud 362, the shroud glows to attract attention to the location of imaging assemble 1140. In certain operating modes as indicated in FIG. 1i data collection device 100 in accordance with any FIGS. 1i-1k display 1094 a PIN entry screen prompting a customer to enter PIN information into touch screen overlay 1095. In other operating modes, as indicated in FIG. 1i, data collection device 100 displays on display 1094 a signature prompt screen prompting a customer to enter signature information into the device with use of a stylus 505.

Selection of various modes of operation may be made with use of a GUI 209 as is depicted in FIG. 1b. GUI 209 displayed on display 1095 may include a plurality of control buttons in the form of selection icons, such as bar code decoding icon 350, RFID decoding icon 351, location detection icon 352, image capture icon 353, and web browsing icon 354. High level operating systems, such as WINDOWS CE, GNU/Linux, and Symbian support GUI functionality. Selection of one of the icons, 350, 351, 352, 353, and 354, drives device 100 into a mode of operation corresponding to the selected icon. As indicated in connection with FIG. 1b, pointer controller 1060 may be used to move pointer 210.

When the control button provided by Internet icon 354 is selected, device 100 is driven into a web browsing mode of operation. Device 100 may incorporate a web browser for enabling device 100 to be utilized for navigating between websites disposed within various servers of the Internet, e.g., with reference to the network diagram of FIG. 2a, servers of LAN 1102, and LAN 1108. Available web browser software packages for hand held devices include Opera for Mobile by Opera Software, Netfront by Access, and Minimo by the Mozilla Foundation, WebPro 1.0 by Novarra, and/or Win-WAP, available from Slob-Trot Software, Inc. and Pocket Internet Explorer available from Microsoft, Inc.

With further reference to the exemplary GUI selection screen of FIG. 1b, selection of bar code decoding icon 350 drives device 100 into a bar code reading mode of operation such that an actuation of trigger 1050 subsequent to a bar code decode mode being selected results in control circuit 1010 capturing an electronic image representation, subjecting the electronic image representation to a decode attempt and automatically outputting of a decoded message (e.g., a decoded message is one or more of (i) displayed on display 1094 (ii) stored into memory 1021, or 1023, and (iii) uploaded to a spaced apart device 1350 or 1850 where device 100 is located at LAN 1102). Selection of RFID decoding icon drives device 100 into an RFID decode mode of operation such that an actuation of trigger 1050 subsequent to an RFID decode mode being selected results in control circuit 1010 controlling RFID reader unit 1250 to broadcast a radio frequency signal in attempt to activate RFID tags in a vicinity of device 100, automatically decoding an RFID tag encoded message carried by a received signal utilizing RFID reader unit 1250, and automatically outputting a decoded RFID tag message, e.g., to display 1094 and/or server 1350 or 1850. Selection of image capture icon 353 drives device 100 into a picture taking mode of operation such that a subsequent actuation of trigger 1050 results in control circuit 1010 automatically capturing a two-dimensional electronic image representation corresponding to the present field of view of imaging assembly 1140 and automatically outputting the two-dimensional electronic image representation into one or more of (i) a memory of device, e.g., device 1021 or 1023 (ii) a spaced apart device e.g., 1310, 1350, 1810, 1850, and (iii) display 1094, as described previously herein without decoding being executed and without a decoded message being output. Device 100 can be configured so that icons 350, 351, 353 serve as triggers as well as mode selections. That is, device 100 can be configured so that actuation of one of icons 350, 351, 353 results in a trigger signal being generated and a certain operating mode being activated such that there is no need to actuate trigger 1050 after an icon 350, 351, 353 is actuated.

Referring again to the exemplary device of FIG. 1a, Device 100 may further include a plurality of communication links such as an 802.16 communication link 1284, 802.11 communication link 1286, a communication link 1288 for communication with a cellular network such as a network in accordance with the Global System for Mobile Communications (GSM), a Bluetooth communication link 1292, and an IR communication link 1290 facilitating communication between device 100 and an external device spaced apart from device 100. As seen in the network view of FIG. 2a, device 100 may be part of a local area network ("LAN") 1102 including a spaced apart and separately housed local host processor 1350 and other hand held devices 100', 100". Referring ahead to the network views of FIGS. 2a and 2b, cellular network 1502 is represented. In one embodiment, network 1502 can be a GSM network. Where cellular network 1502 is provided by a GSM network, the network supports packet based wireless communication in accordance with the General Packet Radio Service (GPRS). In another embodiment, cellular network 1502 can be provided by a CDMA network. Cellular radio 1288 can be a CDMA radio that connects to any CDMA network, including, but not limited to, Qualcomm's CDMA2000 1xRTT, CDMA2000 1xEV-DO, or W-CDMA/UMTS networks. The above cellular network including the above GSM network and the listed CDMA networks all support high-speed packet based wireless data transfer.

In addition to having wireless communication links, device 100 may include various physical connector interfaces such as a "D-connector" interface enabling hard wired RS 232 communication with host processor 1310, and USB physical connection interface enabling USB communication with devices of network 1102. Device 100 may further be in communication with a plurality of offsite remote host processors or servers located several miles to thousands of miles away from device 100. Remote host processors 1850, 1750, and 1650 may be in communication with device 100 via a wide area network 1400, which may be the Internet. All of the components of FIG. 1a may be disposed in and supported by hand held housing 105, as shown in FIG. 1b.

Figure 2A:
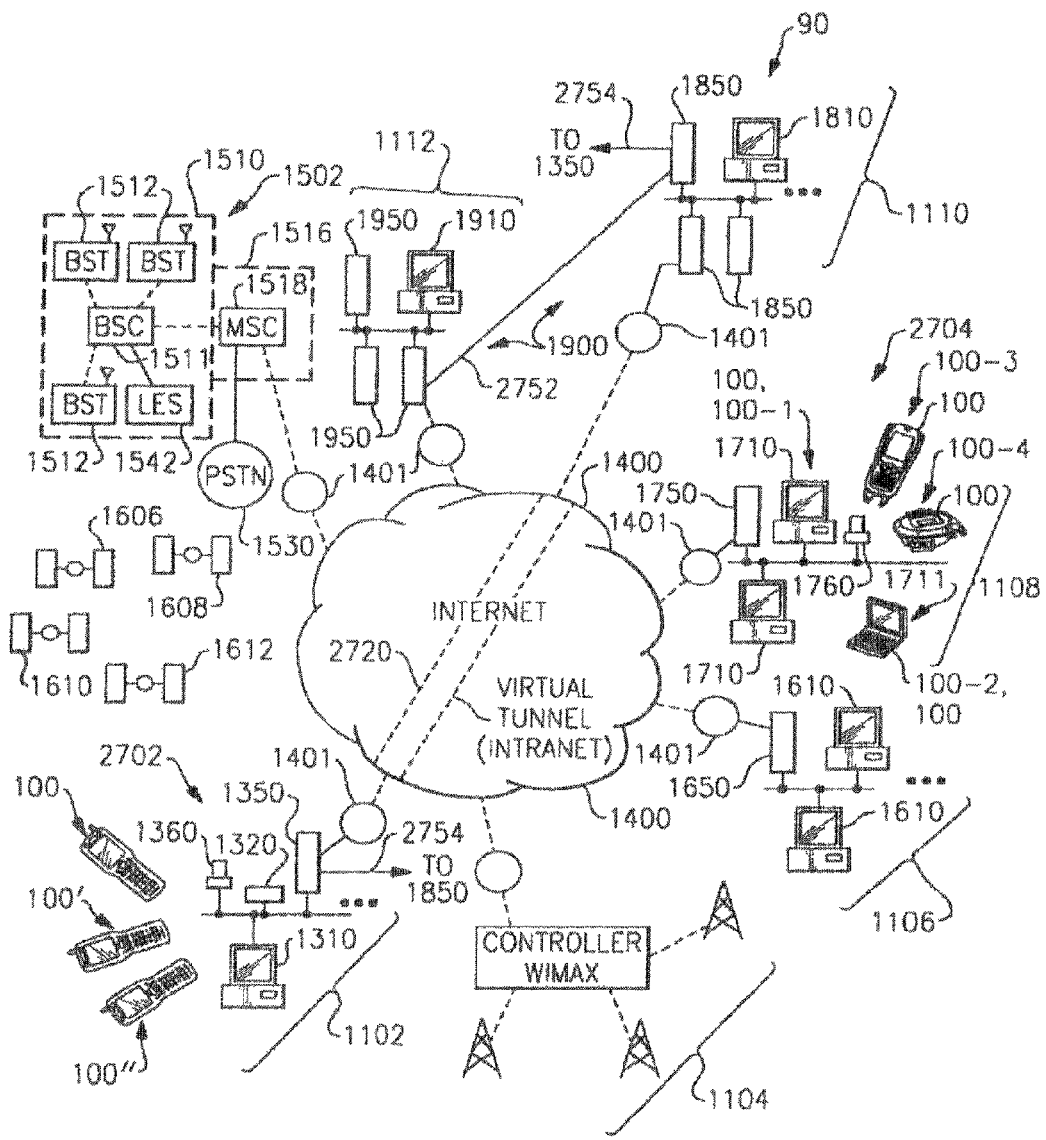
FIG. 2a is a network schematic view of a data collection system according to the invention.

In another aspect, device 100 includes a location detection unit 1280. Location detection unit 1280 detects the physical location of device 100 and reports position information to control circuit 1010. Specifically, in one embodiment, location detection unit 1280 outputs a "NMEA string" including coordinate location information, which string is parsed by control circuit 1010. Referring to FIG. 2a, location detection unit 1280 receives signals from a series of satellites 1606, 1608, 1610, and 1612, which may be satellites of the Global Positioning System (GPS) or GLONASS. Each satellite 1606, 1608, 1610, and 1612 includes an atomic clock and reports time-stamped signals to location detection unit 1280. With a timing system that includes atomic clocks in each orbiting satellite, module 1280 can determine a distance from location detection unit 1280 to a transmitting satellite. The present GPS system includes 24 operational GPS satellites orbiting the earth. When location detection unit 1280 receives signals from three of satellites 1606, 1608, and 1610, location detection unit 1280 may determine a location (x,y coordinates) of device 100. When location detection unit 1280 receives signals four of satellites 1606, 1608, 1610, and 1612, location detection unit 1280 may determine location of device 100 which includes, in addition to (x,y) coordinate values, (latitude and longitude) altitude information and (x,y,z) coordinate values. In determining a location of device 100, location detection unit 1280 determines its present distance from each of three satellites and extracts location information utilizing triangulation.

Location detection unit 1280 determines the position of device 100 by processing of signals from satellites 1606, 1608, 1610, and 1612. Location detection unit 1280 may include a signal conditioning circuit 1602 including such elements as a SAW filter, an RF converter, a frequency synthesizer, a reference oscillation, an analog-to-digital converter, and a signal processing unit 1604 including such elements as a digital receiver and a processor IC chip. Signal conditioning circuit 1602 may receive and condition signals from various satellites 1606, 1608, 1610, and 1612, as are shown in FIG. 2a, whereas signal processing circuit 1604 processes the received signals to determine such information as coordinate location information and velocity information. Signal processing circuit 1604 produces output data which is input to processor IC chip 1030 and processed by control circuit 1010. Location detection unit 1280 may be e.g., a GPS location detection unit or a GLONASS location detection unit or a combined GPS/GLONASS location detection unit.

The output data produced by location detection unit 1280 and received by control circuit 1010 may include coordinate information, e.g., latitude/longitude coordinate values representing the current location of device 100. In particular, location detection unit 1280 may output serial digital data known as a "NMEA string" and control circuit 1010, programmed to execute a NMEA string parsing software module, parses the input NMEA string to extract latitude and longitude coordinate values from the input NMEA string. Control circuit 1010 may also extract other information, such as altitude and velocity values, from an input NMEA string.

In a further aspect, location detection unit 1280 may include mapping software stored therein. Signal processing circuit 1604 may cross-reference calculated coordinate information with location information of the mapping software and report, together with coordinate location information, street address information. In addition to reporting location information, location detection unit 1280 may also report vector velocity information indicating a speed of travel of device 100.

System 90 as shown in FIG. 2b may be configured to detect a location of an individual device 100 by processing of signals other than signals received by location detection unit 1280. For example, device 100 as shown in FIG. 1a may be configured to receive at least one of location information or location indicating information from a network through a general data communication radio transceiver such as cellular radio transceiver 1288 or radio transceivers 1284, 1286, and 1292. Location detection systems may be divided into two main categories: "satellite based" and "network based." Satellite based location detection systems, as described above, such as GPS detection systems require the integration of dedicated hardware, e.g., hardware 1280 into device 100 dedicated for purposes of receiving signals from a series of orbiting satellites, and a processing circuit such as control circuit 1010 configured to process the signals into location information. In a network based location detection subsystem an individual mobile device 100 may (1) receive location information from a network, such as a ground based network, the network including a processor that processes radio signals from one or more mobile devices to determine a location of one or more mobile device, (2) receive coarse location information from a ground based network based on the network's location, or (3) receive a location indicating network identifier (e.g., a cell ID of a cellular network, an SSID of an IEEE 802.11 network) from a network device from which coarse location information can be extracted by processing of the network identifier. A control circuit 1010 can be configured to determine location information (e.g., location coordinates) from a network identifier by sending the network identifier as a key to a table correlating network identifiers with location coordinates. The tables can be disposed in memory 1020 of device 100 within housing 105 or in another memory of system 90.

As indicated by the diagram of FIG. 1f, device 100 can have software modules 1295, 1296, and 1297 which enable control circuit 1010 to execute such processes as parsing a NMEA string containing location information, receiving location information from a network, receiving a network identifier from a network and processing a network identifier to generate location information. With further reference to location determination circuits as are described herein, location determination circuits of device 100 enabling control circuit 1010 to receive location information (e.g., coordinate location information) can include one or more of (a) a location detection unit 1280 receiving signals from a series of orbiting satellites in combination with an appropriate software module 1295 configuring control circuit 1010 to parse a serial data string output from the location detection unit; (b) an appropriate software module 1296 configuring control circuit 1010 to receive location information from a data communication network, such as network 1102, 1104, 1106, or 1502 by way of wireless receipt of a data packet containing the location information through an appropriate radio transceiver 1286, 1284, 1288; and (c) an appropriate software module 1297 configuring control circuit 1010 to (i) receive a network identifier from one of networks 1102, 1104, 1106, or 1502 by way of wireless receipt of a data packet containing e.g., a Cell ID, an SSID, a channel set signature or other network identifier through an appropriate radio transceiver 1286, 1284, 1288 and (ii) process the received network identifier utilizing a table lookup to extract location information from the network identifier. Software module 1296 can also configure control circuit 1010 to request location information from a data communication network 1102, 1104, 1106, 1502. Software module 1297 can also configure control circuit 1010 to request a network identifier for use in determining a present location of device 100. A location determination circuit described herein which includes location detection unit 1280 and which process signals from orbiting satellites and includes a software module 1295 for configuring control circuit 1010 to parse an output from location detection unit 1280 can be regarded as "satellite based" location determination circuit. A location determination circuit described herein which includes a data communication network radio transceiver 1286, 1284, 1288, and a software module enabling control circuit 1010 to receive location information from a data communication network or to receive location information by determining location information from a network identifier, or by alternative processing of data received from a data communication network, e.g. network 1102, network 1104, network 1106, or network 1502 can be regarded as a "network based" location determination circuit. While the location determination circuits described in corporate control circuit 1010 (appropriately configured per the requirements of the location determination circuit) it is understood that the location determination circuits described herein can be provided by dedicating hardware circuitry or by a combination of hardware and software.

More sophisticated higher accuracy network based location detection technologies include Angle of Arrival (AOA), Timing Advance (TA), Advanced Forward Link Trilateration (AFLT), Enhanced Forward Link Trilateration (EFLT), Enhanced Observed Time Difference (EOTD), and Time Difference of Arrival (TDOA).

In one embodiment, device 100 incorporates MATRIX software available from Cambridge Positioning Systems, Inc., of Cambridge UK. With MATRIX software installed in device 100, device 100 receives location information from network 1502, where network 1502 is a GSM network configured to operate in accordance with the MATRIX location detection system, which utilizes EOTD. Network 1502, which is described more fully in connection with FIG. 2a, may include a location extraction server ("LES"). Location extraction server 1542 processes radio signals from a plurality of devices 100, 100', and 100," linked to network 1502 in order to determine a location of a certain device 100 requesting location information. When location extraction server 1542 determines a location of a device 100, location extraction server 1542 reports location information back to device 100. Device 100 may also incorporate a product which together with location extraction server 1542 determines a location of device 100 based on prior radio signals transmitted by device 100 to network 1502. An example of a product which enables determination of location information based on prior radio signals sent by device 100 is MATRIX SOLO, also available from Cambridge Positioning Systems. Network based location information can be yielded from a CDMA cellular network utilizing Quallcomm and SnapTrack Inc.'s gpsOne system as is described further herein.

Device 100 may also incorporate a product enabling device 100 to receive location information based on a combination of location information received from dedicated location detection unit 1280 and an alternative location detection system. With MATRIXHYBRID software incorporated into device 100 and with device 100 operating in communication with an appropriately configured network, device 100 determines location information primarily based on data from a location detection unit 1280, but automatically requests location information from network 1502 if location detection unit 1280 does not report valid location data. Location detection unit 1280, where provided by a GPS unit, may not report valid data if, for example, device 100 is indoors, within a vehicle, in a city with tall buildings interfering with reception of signals from GPS satellites, or in a canyon.

Assisted GPS (A-GPS) technologies such as is offered by MATRIXHYBRID technology also improve the accuracy of location detection when both detection systems (GPS and GSM) are operational by speeding up the initialization of communications between unit and satellites. Assisted GPS systems process information from both satellite based and network based location detecting systems. Network based location information identifying the location of device 100 may also be received from networks other than cellular network 1502. Information respecting the present location of device 100 may also be received from e.g., network 1102, network 1104, or network 1106, as shown in FIG. 2a and FIG. 2b, when device 100 is in range of one or more of networks.

In another embodiment, device 100 incorporates Qualcomm and SnapTrack, Inc.'s gpsONE system to obtain cellular network based location information. gpsONE is another implementation of an A-GPS system that utilizes information from CDMA networks. Cellular radio transceiver 1288 of device 100 can incorporate an embedded Qualcomm chipset, such as the MSM7600, that supports gpsONE functionality. The gpsONE system combines GPS satellite information and cellular network range information to provide fine-grain location information and extend location service coverage. Device 100 will initiate a location request through the cellular network. Location extraction server 1542 will use the high-level cell ID information that it receives from device 100 and respond with information about what the best GPS satellites to listen to are. Device 100 will receive GPS information from the satellites 1606, 1608, 1610, 1612 and combine it with ranging measurements taken from the cellular network and send the data to server 1542. Server 1542, in turn, processes the information from device 100 together with a network based location calculation, and returns a location information reading to device 100 which is more precise than a location information reading based on a processing of data received from orbiting satellites only.

In addition to the above location detection systems, a specific type of network identifier known as a Cell ID is generally available from cellular network 1502. A Cell ID includes sufficient information to extract the latitude/longitude coordinates of the base station transceiver 1512 currently in communication with device 100. Device 100 may request a Cell ID from cellular network 1502 and in response to such a request, network 1502 returns to device 100 a Cell ID including information sufficient to extract the latitude and longitude of the base station 1512 currently in communication with device 100. In general, device 100 is configured to extract latitude and longitude coordinate information from a received Cell ID value where device 100 is equipped with mapping software or lookup tables correlating cell ID's with location information. Cell Network ID coordinate location information tables may also be disposed in a memory of system 90 external to and spaced apart from device 100. The accuracy of the location detection provided by the Cell ID is limited by the size of the cell currently in communication with devices. Cells range in sizes currently between from about 100 m and about 3000 m in present day U.S. cellular networks. Accordingly, the retrieval of a Cell ID value by device 100 from cellular network 1502 retrieves location indicating information that is processable to determine coordinate location information that is accurate within a tolerance of about 3000 m relative to the actual location of device 100. Thus, in a simple embodiment, device 100 is equipped with location detection functionality simply by configuring device 100 to request and receive a Cell ID from network 1502, and to include in system 90 suitable lookup or mapping data sufficient to enable extraction of latitude or longitude information from Cell ID values.

As has been indicated, device 100 may be configured to receive location information respecting the location of device 100 from networks other than cellular network 1502. For example, a positioning system available from Ekahau, Inc., of Saratoga, Calif., enables device 100 to detect a location of device 100 by processing of signals received via 802.11 transceiver 1286. According to a positioning system available from Ekahau, Inc., a small current software module ("EKAHAU CLIENT") is loaded onto device 100 and a specially developed WI-FI tag (the "EKAHAU T101 WIFI TAG") is affixed to device 100. Server software (EKAHAU POSITIONING ENGINE 3.0) is loaded onto a computer in communication with device 100 via 802.11 transceiver 1286. The programmed server 1350 (FIG. 2a) calculates to x, y coordinate position, speed, heading, and area of device 100 and reports the processed information to device 100. With reference to the network view of FIG. 2*a*, the reporting of network based location information to device 100 may be transmitted by access point 1360 to device 100.

Location detection services are also available in which location information is made available from MAN 1104 and MAN 1106. For example, the LONGHORN location detection system available from MICROSOFT has been developed to provide location information to devices of a network operating in accordance with the IEEE802.16 Standard.

While systems such as the EKAHAU POSITIONING ENGINE 3.0 system provide location information within a few meters, it is understood that coarse location information is easily processed from a network identifier available from any network which device 100 may be in a connection range distance from. By keying a network identifier coordinate table or system 90 utilizing a received location indicating network identifier, where system 90 is configured to include a network identifier location coordinate table with a coordinate entry for a received network identifier. For example, when device 100 is in range of supplier LAN 1102 (either via 802.11 radio transceiver 1286 or Bluetooth radio transceiver 1292) device 100 may receive from LAN 1102 a network identifier such as SSID (IEEE 802.11 network) sometimes referred to as a "Network ID." Device 100 can also receive a network identifier provided by a "Cell ID" of a cellular network, or an IP address of any type of physical network if it is desired to utilize a network layer network identifier. It will be seen that device 100 may receive a network identifier from any network to which device 100 is presently in a connection range. Further, latitude, longitude x,y coordinate values for each of area networks 1102, 1104, 1106, 1108, 1114 may be stored in memory 1020 of device 100 or another accessible memory of system 90. Accordingly, by retrieving coordinate value corresponding to a network identifier presently received by device 100, device 100 is able to determine a coarse present location value.

It is seen that device 100 may be equipped with various location determination circuits which have varying accuracy tolerances. Cell ID network based location detection provides location determination within about 3000 m. EOTD network based location determination utilizing GSM network 1502, as provided in the MATRIX location detection system, provides location detection within a tolerance of about 50 m. Satellite based GPS location detection provides location detection within a tolerance of about 3m. Assisted GPS systems which process GPS location readings together with network based location readings are even more accurate.

With further reference to FIGS. 2*a* and 2*b*, further aspects of a larger system 90 in which device 100 may be integrated are described. Device 100 may be part of a Local Area Network (LAN) 1102, which may be located at the warehouse of a supplier/distributor (a supplier facility 2702). LAN 1102 may support communications in accordance with the IEEE 802.11 communications standard, and/or the Bluetooth communications standard. Supplier/distributor LAN 1102 may include such elements as one or more PC's 1310, a server 1350, and an access point 1360. LAN 1102 may be in communication with network 1400 which in turn is in communication with additional networks 1104, 1106, 1108, 1110, 1112, and 1502. Network 1400 may include any publicly accessible telecommunications infrastructure. Network 1400 is capable of supporting device communications in accordance with the TCP/IP suite of protocols. Because network 1400 can be provided by the Internet, it is alternatively designated herein as Internet 1400.

Access point 1360 may be configured to carry out a variety of useful operations. For example, access point 1360 may establish connectivity between access point 1360 and each of several data collection devices 100, 100', 100" so that each of the several portable devices are in communication with server 1350, network 1400 and server 1850 through access point 1360. Access point 1360 may be configured to examine control fields of data packets received from a device, e.g., device 100 to determine whether a power save function has been activated, and if a power save function has been activated, access point 1360 may buffer data packets received by access point 1360 that are addressed to the device 100 requesting access to the power save function. Access point 1360 may also be configured to examine control fields of a data packet received from a device, e.g., device 100 to determine whether the received data packet has been encrypted and if the data packet has been encrypted may decrypt the data packet using a predetermined key. Access point 1360 may also be configured to examine control fields of data packets received from a device, e.g., device 100 to determine the value of designated maximum packet size threshold, and whether the size of a received data packet is above the designated maximum packet size threshold. Access point 1360 may also be configured to send "Clear to Send" messages to a plurality of networked devices 100, 100', 100" to designated time slots wherein the devices 100, 100', 100" may send data to access point 1360. Access point 1360 may be configured to coordinate the allocation of time slots to the end that collisions which would otherwise result from several devices sending data packets to access point 1360 are avoided. Access point 1360 may be configured in accordance with the IEEE 802.11 Standard (i.e., any one of the IEEE 802.11, 802.11a, 802.11b, 802.11g, 802.11e, and 802.11i specifications).

Referring to additional aspects of system 90, system 90 may include one or more WIMAX network 1104. When device 100 including WIMAX radio 1284 as shown in FIG. 1*a*, data may be transmitted between device 100 and network 1104 in accordance with the IEEE 802.16 communications standard. WIMAX network 1104 will support communications with device 100 when device 100 is within up to 50 miles of network 1104. Because of the range capabilities of network 1104, network 1104 is sometimes referred to as a metropolitan area network (MAN). In an important aspect, device 100 is in communication with a remote server 1850 of network 1110. Server 1850 stores route records and manages data collected by device 100 and later uploaded to server 1850. Referring to system 90, network 1108 represents a network physically located at the location of a delivery destination of device 100 (the delivery destination facility 2704), as will be explained further herein.

LANs 1102, 1104, 1106, 1108, 1110, and 1112 may be connected to network 1400 by way of gateways 1401 serviced and maintained by one or more Internet Service Providers (ISPs), or by the providers of the various networks.

When device 100 is in proximity with supplier/distributor LAN 1102, device 100 may communicate with a component of LAN 1102 via short range wireless communication link such as 802.11 link 1286 (FIG. 1*a*), which is in communication with 802.11 access point 1360, or with Bluetooth communication link 1292, which is typically in communication with a Bluetooth transceiver integrated into PC 1310 (FIG. 2*a*), or a Bluetooth access point.

When device 100 is out of range of LAN 1102 (outside the range limits of 802.11 radio 1283 and Bluetooth radio 1292), device 100 may communicate with network 1400 (and therefore LANs 1102, 1104, 1106, 1108, and 1110) via cellular radio transceiver 1288 which may be a GSM/GPRS radio transceiver or a CDMA cellular radio transceiver. Cellular transceiver 1288 is in communication with a base station subsystem 1510 including a base station controller (BSC 1511) and plurality of base station transceiver (BSTs 1512). Thousands of BSTs 1512, each providing communication in a region known as a "cell," may be spaced apart over a geographical area. Base station subsystem 1510 is further in communication with a switching subsystem 1516. Switching subsystem 1516 includes a mobile services switching center (MSC 1518), MSC 1518 processing data from a plurality of databases including a Visitor Location Register (VLR), an Equipment Identify Register (EIR), an Authentication Register (AUC), and a Home Location Register (HLR). Switching subsystem 1516 transmits data to and receives data from a Public Switched Telephone Network (PSTN 1530) and gateway 1401 for IP network 1400. Network 1502 may also include a location extraction server 1542, as will be described further herein. Cellular network 1502 is, at the time of the invention, widely distributed throughout Europe, North America, and other continents.

Figure 3B:
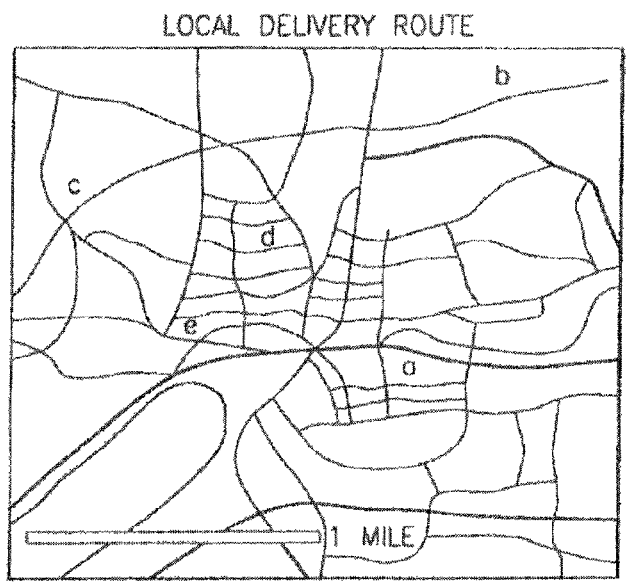

According to the invention, device 100 is configured to operate in a delivery data management system 90 in which transaction data collected at various delivery destinations by device 100 is uploaded to a remote server 1850, and in which route reports are periodically downloaded from server 1850 or downloaded on command to device 100. Device 100 may be utilized in the delivery of, e.g., mail, parcels, farm produce, retail goods, and other articles which might be labeled with identifying labels such as bar code labels and/or RFID tag labels. As indicated by national map of FIG. 3*a*, device 100 may be utilized in non-local, e.g., regional or national, delivery routes. As indicated by local map of FIG. 3*b*, device 100 may be utilized in the process of making local deliveries (e.g., within 30 miles of a supplier origination location or warehouse). In general, "routes" as used herein are characterized by having an origination location and an end location that are normally the same location (that is, a delivery truck normally starts a journey from a supplier warehouse and ends at a supplier warehouse to pick up additional supplies). "Routes" as used herein normally have a plurality of intermediate delivery destination locations that are intermediate origination and ending locations. In the example of FIG. 3*a*, a vehicle 402 is required to deliver items at destination locations A, B, C, and D prior to return to origination/end location A. In the example of FIG. 3*b* (local delivery), device 100, installed in vehicle 402 (FIG. 5) is required to make deliveries at a plurality of local delivery destination locations a, b, c, d, and e prior to returning to origination location a.

For adapting device 100 to operate in a delivery system, delivery vehicle 402 may be equipped with a holster 404 and an auxiliary antenna 406, as described with reference to FIG. 5 and FIG. 1*b*. Delivery vehicle 402 and holster 404 may be configured so that when device 100 is received in holster 404 device 100 receives power from the vehicle power supply system in order to recharge rechargeable battery 415 of device 100, as shown in FIG. 1*a*, wherein battery 415 supplies power to device printed circuit boards 108.

Further, holster 404 is in communication with auxiliary antenna 426 so that location detection unit 1280 is in communication with auxiliary antenna 426 when device 100 is installed into holster 404 in order to couple matching connectors 431 and 432 of device 100 and holster 404, respectively shown in FIG. 1*a*. Providing auxiliary antenna 426 enhances the ability of device 100 to receive signals from location detection satellites 1606, 1608, 1610, and 1612 when device 100 is located within a vehicle 100.

An alternative network view of system 90 in which device 100 operates is explained in connection with FIG. 2*b*. Device 100 will be installed in a vehicle 402 which will travel a distance between a supplier origination location A and a destination location B. The origination location may be e.g., a supplier warehouse. When traveling between origination location A and destination location B (taking the non-local delivery route example of FIG. 3*a*), device 100 will pass through a "connection range" distance of a plurality of area networks. For example, when at an origination location, device 100 will be within communication range of LAN 1102. At some distance away from an origination location A, vehicle 402 will be out of range of LAN 1102 but may be in communication with one or more other area networks such as network 1106, network 1112, or network 1104. WIMAX networks 1104 are metropolitan area networks (MANs) which communicate with device 100 through 802.16 radio 1284. Whereas device 100 must be within several hundred feet of LANs 1102 and 1112, device 100 may be in communication networks 1104 and 1116 when within about 10 to 50 miles of WIMAX networks 1104 and 1116. During the course of traveling from an origination location A to a destination location B, device 100 may process location data received from satellites 1606, 1608, 1610, and 1612, or via the operation of an alternative location detection system, in order to determine which area network 1102, 1106, 1112, 1114, and 1116 to connect to. At any point in the travel between supplier origination location A and destination location B, device 100 is likely to be in communication with cellular network 1502. The integration of the cellular network 1502 has been significant, and coverage by the cellular network 1502 has extended to all but remote low population areas. The inventors have recognized that because of the extensive integration of cellular network 1502, (e.g., with the widespread integration of the GSM network and various CDMA networks) communication by device 100 to and from cellular network 1502 provides a reliable communication path at any point in the travel of vehicle from an origination location A to a destination location B. However, because data rates are higher with utilization of other networks and services available with use of other networks, communication to and from server 1850 via another network, such as network 1104 or network 1106, may be desirable in certain instances attendant to the delivery of articles from an origination location to a destination location, or between destination locations along a route.

While records database/route report server 1850 is designated by a single black box in the view of FIG. 2*b*, it is understood that server 1850 is likely to be physically constituted by a plurality of computers (e.g., a "server center" typically comprising several to thousands of UNIX servers otherwise known as a "server farm") particularly where system 90 is employed to manage a large fleet of devices 100 and vehicles 402 incorporating such devices, and where server 1850 is to interrogate multiple databases and additional servers, e.g., server 1950 in the generation of reports and the processing and maintaining of fleet data. Server 1850 may have an associated load balancer for coordinating the services provided by the various computers constituting server 1850. Server 1950 may be located a distance, e.g. miles to thousands of miles away from server 1850.

Delivery data receiving operations, route report generation operations, and database data presentation operations (e.g., operations for assembling active web pages containing data collected over the course of several delivery transactions and/or several routes by one or more devices 100), can all be contained within a single LAN, e.g. LAN 1110, owned and operated by a single delivery data management entity.

In another embodiment, delivery data receiving operations, route report generation operations, and database data presentation operations controlled and managed by a delivery data management entity are spread out over more than one local area network. As indicated by the network views of FIGS. 2a and 2b, a delivery data management entity or interest may manage and operate a plurality of LANs such as LAN 1110 and LAN 1112 which are spaced apart over miles to thousands of miles. LAN 1110 may be constructed to receive delivery data and to transmit route reports to a fleet of devices 100, 100', and 100". LAN 1112 may be constructed to assemble active web pages summarizing data collected over the course of several (e.g., tens of thousands) delivery transactions collected over time by a fleet of devices 100, 100', and 100". LANs 1110 and 1112 may have separate gateways 1401 to network 1400 and may be interconnected by a private communication link, as is indicated by FIG. 1a. Private communication link 2752, sometimes referred to as a "solid tunnel" link or a "lease line", may be e.g., a DSL broadband, ATM, Frame Relay, or private RF data communication link (such as a private satellite base or ground-to-ground private RF link).

Where data management operations (data receive, report generation, and presentation) are distributed over servers of several physically separated networks, e.g., servers 1850 and 1950, the collection of data management servers may be referred to herein as a data management server network 1900.

In many applications, data collected by device 100 may be sensitive high security data, and it will be important to maintain privacy of collected data such as article identification data and signature data so that such data is not siphoned by unscrupulous parties. In an important aspect of the invention, a supplier LAN 1102 (the local area network at supplier facility 2702) and data management server network 1900 may be part of a private network or intranet.

In one embodiment, a private network including LAN 1102 and network 1900 may be provided with a private communication link 2754, as indicated by FIGS. 2a and 2b, that couples server 1350 at a supplier's facility 2702 with server 1850 of data management server network 1900. Private communication link 2754, sometimes referred to as a "solid tunnel" link, may be e.g., a DSL, broadband, ATM, Frame Relay, or private RF data communication link (such as a private satellite based or ground-to-ground private RF link).

Figure 20A:
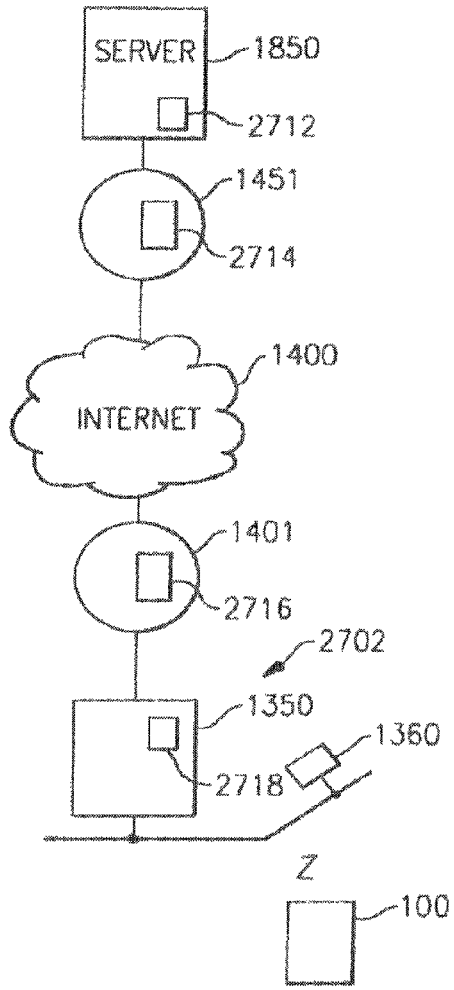
FIGS. 20a and 20b are schematic views of virtual private networks (VPNs) which may be incorporated into a system of the invention.
Figure 20B:
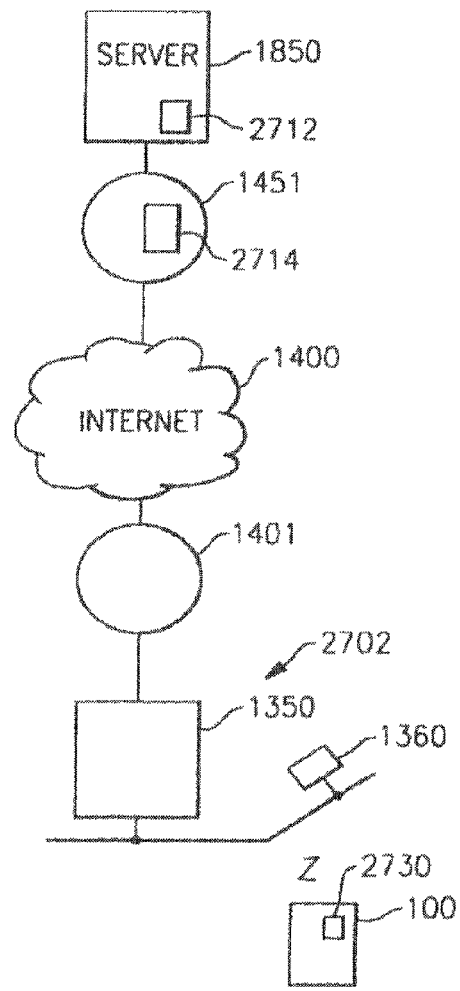

In another embodiment, a private network including supplier LAN 1102 and network 1900 may be established utilizing the publicly accessible infrastructure of network 1400. Private networks may be created utilizing virtual private network (VPN) software modules. Referring to FIG. 20a, VPN software modules 2712 may be incorporated in server 1850 and server 1350, respectively. Further, gateways 1401 maintained by a data management entity and supplier may include VPN routers 2714 and 2716, respectively. An architecture as shown in FIG. 20a may provide multiple virtual tunnels over a publicly available telecommunications network such as virtual tunnel 2720 as shown in FIG. 2a. An alternative VPN network is shown in FIG. 20b. In the embodiment of FIG. 20b, a client VPN software module 2730 is installed on device 100 to establish a virtual private network including device 100 and remote server 1850. VPN software modules apply security processing to transmitted data packets carrying delivery transaction data. Such security processing includes data encryption and decryption (data is encrypted at transmitting end and decrypted at receiving end). Commercially available VPN systems include MICROSOFT VPN SOFTWARE from Microsoft, Inc., GUARDIAN DIGITAL SECURE VPN for Guardian Digital Corporation, ACCESSPOINT VPN from Menlo Logic, Inc., and TWINGO SYSTEMS VPN software available from Cisco, Inc. The above mentioned ACCESSPOINT and TWINGO SYSTEMS VPN packages are Secure Socket Layer (SSL) based VPNs which allow users to access secure VPN websites without client software. The providing of a VPN between supplier LAN 1102 and data archiving LAN 1110 provides additional advantages. The providing of a VPN allows file directories of LAN 1110 to be readily accessed by devices at LAN 1102 and file directories at LAN 1102 to be readily accessed by devices at LAN 1110. Thus, an operation at device 100 at LAN 1102 can e.g., readily select new data collection programs that may be made available in a directory of LAN 1110, or access data collection records. A service provider at archiving facility LAN 1110 can similarly access files of LAN 1102 to e.g., determine if devices 100, 100', 100" are adequately provided with the most recently available versions of data collection programs.

Referring to further aspects of system 90, as shown in FIGS. 2a and 2b, system 90 may include a credit/debit transaction network 2102 capable of approving or declining credit and debit card transactions. Credit/debit transaction network 2102 is accessible via the Public Switched Telephone Network (PSTN) 1530, which is available via GSM 1502. Card reader unit 1350 and GSM radio transceiver 1288 operate in combination, therefore, to facilitate wireless credit and debit card transactions at virtually any remote delivery location.

Anonymous client 2110 of system 90 indicates that users may be desirous of accessing data from server 1850, including data uploaded to server 1850 from devices from various communications enabled device including devices 100, 100', and 100," and devices other than devices 100, 100", 100." That is, with reference to FIG. 2a, computer users in locations, such as in any one of the vicinities of network 1102, network 1104, or network 1106, may wish to view data from server 1850. In one embodiment, server 1850 is configured to store web pages, such as .HTML and .XML web pages, for viewing by a user at a remote client 2110 equipped with a suitable browser program.

Figure 6:
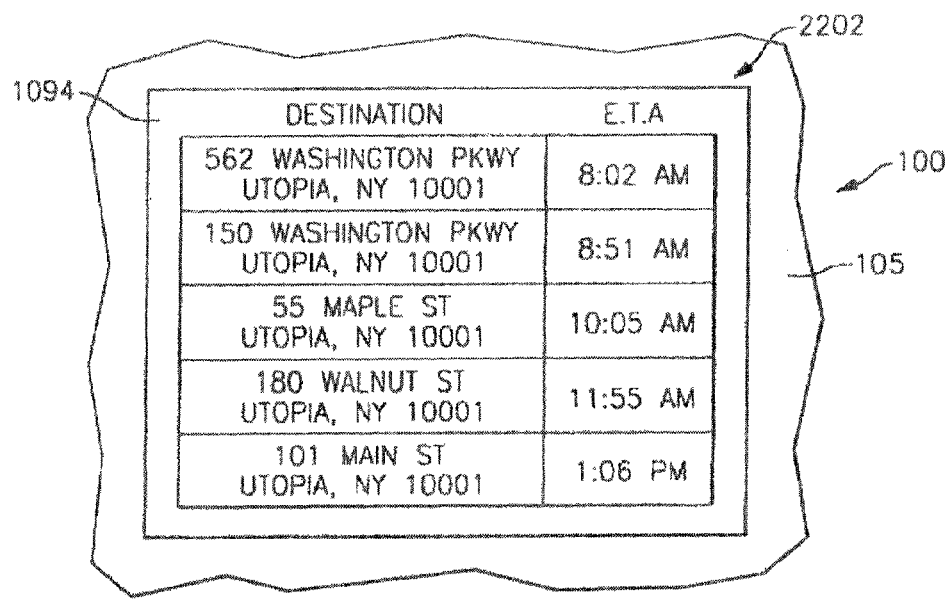
FIG. 6 illustrates an example of a route report which may be downloaded from a remote server to a client mobile data collection device in accordance with the invention.

System 90 is adapted so that from time to time server 1850 sends route reports to device 100 where device 100 is part of a fleet of devices 100, 100', and 100" receiving such route reports. A route report for device 100 is a listing of the delivery locations scheduled for delivery by the vehicle 402 carrying device 100. In local delivery applications wherein routes are completed within one day, route reports are typically downloaded from server 1850 to a fleet of devices 100, 100', and 100" on a daily basis, or on a several times a day basis if several routes are completed within a day. Device 100 can be configured to display on display 1094 a route report 2202 on receipt there of. In non-local delivery application, where routes are completed within several days, route reports are downloaded to devices of a fleet of devices on an as-needed basis. A possible format for a route report is shown in FIG. 6. In exemplary route report 2202, intermediary destination address locations are listed in a first column and scheduled delivery times are listed in a second column. Route reports might contain information in addition to the destination estimated time of delivery (ETA) information presented in the route report at FIG. 6. For example, a route report might contain traveling directions for aiding a user in traveling between destinations in a route. A route report might also include maps aiding traveler in navigating between intermediate destinations of a route. Route reports may also be downloaded to device 100 on request from device 100. For example, an operator of device 100 might notice that device 100 is devoid of a current valid route report and submit a request to server 1850 to transmit back to device 100 a route report.

Route reports may be generated by remote server utilizing active server pages (ASP). An operator of device 100 may select a hyperlink (e.g., hyperlink 2205, FIG. 7d) that triggers server 1850 to dynamically generate a customized route. Server 1850 can be configured to process a plurality of data in generating a route report including, but not limited to, the operator's identification, current location, and previous locations which data is transmitted to server 1850 via an HTTP data transmission when hyperlink 2205 is clicked on. In one example of the invention, a get command combined with an argument containing the data (operator identification, current location, previous location) is transmitted to server 1850 when hyperlink 2205 is clicked on. In another example, an .XML file is transmitted to server 1850 in response to hyperlink 2205 being actuated. System 90 can be configured so that certain fields of the route report, such as estimated time of arrival, are active fields that are periodically updated by server 1850. System 90 can be configured so that server 1850 installs a cookie on device 100 and periodically acquires data (operator identification, current location, previous location) from device 100 utilizing the installed cookie. Further, system 90 can be configured so that server 1850 periodically and automatically, without a request from device 100, sends updated field data to device 100 via HTTP data transmissions. Active fields can also be used for real-time calculations of arrival data. Depending on its location, device 100 may make a route request to server 1850 over any available network connectivity, e.g., PSTN via the cellular, 802.11 or WIMAX networks. In a further aspect of system 90, device 100 includes a route report parser which parses the data of the route report 2202 so that device 100 may utilize the parsed report data in the control of device 100.

Device 100 can be configured so that a mode of operation of device 100 automatically changes depending on a sensed location that is sensed by location detection functionality of device 100. For example, in one embodiment device 100 is configured so that device 100 automatically enters form assisted data entry mode of operation when location data satisfies a predetermined criteria.

Figure 7A:
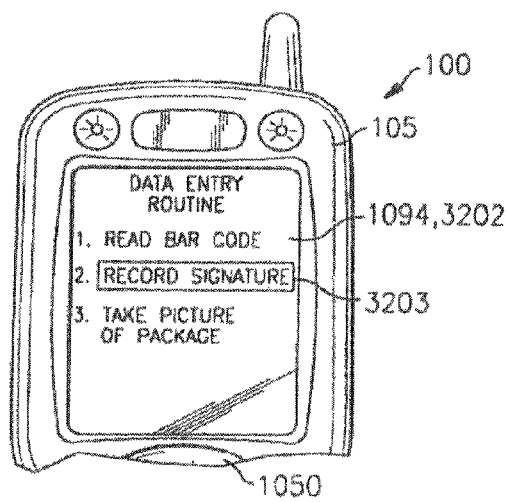
FIGS. 7a, 7b, 7c, and 7d illustrate a mobile data collection device according to the invention operating in a form assisted data entry mode of operation.
Figure 7C:
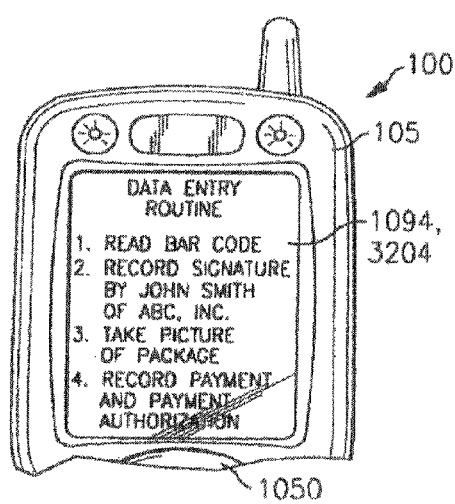
Figure 7B:
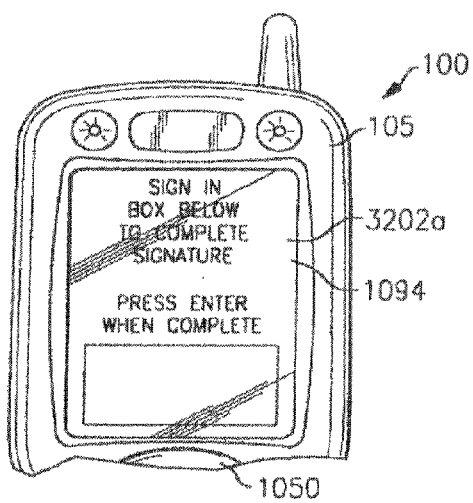

In a form assisted data entry mode, as explained with reference to FIG. 7a-8c, device 100 displays on display 1094 a series of prompts requesting an operator to input data, including article ID data, into device 100 according to a specified routine. With reference to the software integration block diagram of FIG. 8a, the series of prompts of a data entry screen 3202 are driven by a form set 3002 stored in a memory of client device 100. In the example of FIG. 7a, a data entry screen 3202 driven by a memory stored form set 3002 prompts a user to enter data according to a predetermined ordering of steps. Step 1 required by form set 3002 requires a user to scan bar code of package 1202. Step 2 required by form set 3002 requires a user to record a signature of the person receiving the delivered article at the delivery destination location. Step 3 required by form set 3002 requires an operator to capture a digital picture of the package being delivered. Data entry screen 3202 provides confirmation to an operator of device 100 that each step has been successfully taken. Device 100 is configured so that data entry screen 3202, driven by form set 3002, is user interactive. For example, with reference to FIG. 7a, device 100 may highlight a current step currently requiring performance and allow a user to click on a highlighted step when he wishes to perform the step. When an operator selects a certain step, a second form of form set 3002 may drive a secondary data entry screen 3202a associated with the selected step. Thus, subsequent to the "record signature" step being selected by a clicking on the text 3203, device 100 may display the secondary data entry screen 3202a, as shown in FIG. 7b, advising an operator how to complete the step (in FIG. 7b, how to capture a signature). When an individual step is completed, device 100 may display main display entry screen 3202 out of the series of display entry screens driven by form set 3002. Each form of a form set as described herein drives one data entry screen out of a series of interrelated data entry screens displayed during the course of a form-assisted data entry mode. In cases where only a single data entry screen is displayed during the course of a form assisted data entry mode, the form set driving the single data entry screen need only include a single form.

In an important aspect of the invention, device 100 is configured so that device 100 automatically is driven into a form-assisted data entry mode when device 100 arrives at a delivery destination. Device 100 may be configured to monitor a location of device 100 in connection with a delivery destination as specified in report 2202 as shown in FIG. 6. When a location of device 100 and output destination of route report 2202 coincide within a specified tolerance, device 100 automatically displays a data entry screen 3202 in accordance with form set 3002. The specified tolerance may be e.g., a predetermined distance from a delivery destination or a dynamically determined distance from a destination determined on the basis of at least the type of location detection being performed.

When control circuit 1010 executes form set 3002 to display a series of data entry screens 3202, 3202a, etc., control circuit 1010 automatically assigns a transaction number such that all data that is entered into data entry screens driven by the form set 3002 when executed are associated by the common transaction number. When control circuit 1010 executes form set 3002 to display data entry screen 3202, control circuit 1010 further automatically parses a NMEA string output of location detection unit 1280 and/or determines a present location utilizing an alternative location detection subsystem so that a location coordinate value is associated with the transaction number. Referring again to FIG. 1a, processor IC chip 1030 includes a real time clock 1013 which reports the actual date and time and which is periodically updated using a protocol such as the network time protocol (NTP) via a communication with a remote server 1850. In another aspect of the invention control circuit 1010 may be configured so that when trigger 1050 is actuated to read a bar code identifying a parcel or article, control circuit 1010 automatically (i) time stamps the decoded bar code data message, and (ii) contemporaneously parses the NMEA string output by location detection unit 1280 and time stamps the extracted location value extracted from the NMEA string value so that a decoded bar code message identifying a parcel or other article and the location value are stamped with a common time stamp. Configuring control circuit 1010 to stamp a decoded bar code message identifying an article and a location value with a common time stamp provides a record as to accurate location of device 100 at the moment a device 100 reads a parcel or article bar code at delivery location.

In another embodiment as described in connection with FIG. 8b, device 100 has a plurality of data entry form sets 3006, 3008, 3010, and 3012, any one of which may be selected by an operator. In accordance with the invention in another aspect, device 100 is configured to automatically establish a pointer to select one out of a plurality of candidate form sets in a manner that varies depending on a detected location of device 100 and to automatically drive device 100 into a form assisted data entry mode in accordance with the selected form set.

With reference to FIG. 8b, device 100 may include a plurality of form sets 3006, 3008, 3010, and 3012, each driving a particular data entry screen sequence. Device 100 may further include a lookup table 3302 correlating destination locations with screen entry form sets 3002, 3004, and 3006. When device 100 arrives at a delivery destination, device 100 automatically drives device 100 into an assisted data entry mode of operation and the data entry screen displayed on display 1094 (FIG. 1b) is determined by LUT 3302. While form sets and LUT 3302 are shown as being provided on device 100, it is understood that form sets 3002, 3004, 3006, 3008, 3010, and 3012, and LUT 3302 may be stored on another memory equipped device of system 90 and accessed by device 100 on an as needed basis. Further, form sets 3002, 3004, 3006, 3008, 3010, and 3012, and LUT 3302 may be downloaded to device 100 from server 1850 periodically, or on an as-requested basis.

Each form set 3002, 3004, and 3006 of device 100 drives a unique data entry screen sequence. At a second delivery destination location, e.g., location "C" shown in FIG. 3a, a business entity may require entry of a set of data that is different from the set of data entered at a first location. At a second destination location a business entity may wish data to be entered in a different manner. Another data entry screen sequence is described with reference to FIG. 7c. The form set B data entry screen sequence described with reference to FIG. 7c is similar to the form set A data entry screen of FIG. 7a, with two notable exceptions: First, form set B requires that a specific person, at the business located at the location corresponding to form set B to input a signature. Second, form set B requires input of a credit card through card reader 1350 in order to complete a financial transaction at the point of delivery. It will be seen that a multitude of data entry form sets can be created.

In another embodiment, device 100 is configured so that when arriving at a delivery destination, device 100 automatically (i) establishes a pointer to select one out of a plurality of candidate form sets 3002, 3004, and 3006, based in part on a present location of device 100 and further based in part on an output presented by RFID reader unit 1250; and (ii) further automatically drives device 100 into a form assisted data entry mode in accordance with the selected form set.

RFID reader module or unit 1250 is able to wirelessly sense the identification of RFID-tagged entities (e.g., RFID-tagged labels disposed on articles, RFID-tagged identification cards) in the vicinity of RFID unit 1250. RFID tagged entities may include objects such as a truck, parcel delivery packages, and persons such as persons wearing employee identification badges 1270.

With reference to FIG. 11, device 100 may be operated in accordance with a transfer function for selecting attributes of a data entry screen sequence which processes as inputs location data and RFID data. The RFID data processed for determining attributes of a data entry screen (e.g., screen 3202) may include e.g., personal identification data (delivery person, person receiving), delivery truck identification data, and parcel or other article data. Device 100 may select one out of a plurality of candidate screen entry form sets 3002, 3004, 3006, 3008, 3010, and 3012 in accordance with lookup table 3304 as shown in FIG. 8b and FIG. 10. In accordance with lookup table 3304, device 100 always selects form set A when at the "562 Washington Parkway" location, regardless of the identification of a person (in the example provided, the truck driver) or the truck identification (in the example provided, given by manufacturer). At other locations, the selection of a data entry screen driving form set 3002, 3006, 3008, 3010, and 3012 is differentiated based on location, person identification and truck identification. Accordingly, when selecting form sets in accordance with lookup table 3304, device 100 executes a transfer function as represented in FIG. 11.

For mobile operation, device 100 is powered by rechargeable battery 415 and, therefore, power conservation is important to the operation of device 100. As explained in connection with FIG. 1a, RFID reader unit 1250 may operate in a continuous read mode wherein RFID reader unit 1250 continuously, at closely spaced intervals, broadcasts radio signals in an attempt to activate RFID tags 1262 which may be in its vicinity. RFID reader unit 1250 may also operate in a selective activation mode wherein RFID reader unit 1250 selectively sends radio signals in an attempt to activate tags in response to a receipt by control circuit 1010 of a trigger instruction. Device 100 can be configured so that control circuit 1010 receives a trigger signal when trigger 1050 is depressed. Device 100 can also be configured so that a trigger signal is recorded by control circuit 1010 on receipt of a trigger instruction from a spaced report device server, e.g., server 1850, or on the realization by control circuit 1010 that a predetermined criteria has been satisfied. The selective operation mode conserves power relative to the continuous read mode. Device 100 can be configured so that a default mode of device 100 is the continuous read mode when device 100 is powered by an external source such as vehicle 402 and/or a default mode is the selective activation mode when device 100 is not powered by an external source.

In an important aspect of the invention, device 100 is configured so that control circuit 1010 automatically receives trigger signal for activation of RFID reader unit 1250 in response to a specific criteria being met. For example, as described previously, it may be beneficial for the operation of system 90 if control circuit 1010 is configured so that RFID reader unit 1250 automatically activates and reads RFID tags in its vicinity as part of a process of selecting a data entry screen format. As part of the process of selecting a form set, device 100 may be configured so that control circuit 1010 automatically receives a trigger signal for actuating RFID reader unit 1250 when device 100 (or another device of system 90) determines that device 100 has arrived at a delivery destination location, such that, when device 100 arrives at delivery destination, device 100 automatically activates RFID reader unit 1250 and decodes any RF-tag encoded data which may be received by module 1250 as a result of the activation. In the computer device of FIG. 1a, RFID reader unit 1250 is a dedicated RFID reader unit dedicated to the task of reading data from RFID tags and writing data to RFID tags. However, the functionality of RFID reader unit 1250 can also be provided by appropriate configuration of one of radio transceivers 1284, 1286, 1288, 1292.

Another embodiment of the invention is described with reference to FIG. 8c. In the embodiment of FIG. 8c, device 100 includes additional form sets 3016, 3018, 3020, and 3022 which drive various data entry screens when device 100 carried by delivery vehicle 402 arrives back at a supplier facility 2702 after making a delivery. It is observed with reference to FIG. 2b that when device 100 arrives back at supplier facility 2702 device 100 will be within a connection range of supplier LAN 1102.

In accordance with the invention, device 100 is configured so that when device 100 determines that device 100 has returned to supplier facility location 2702, device 100 automatically enters a form-assisted data entry mode of operation by displaying a data entry screen 3206 (FIG. 7d) automatically when returning to a supplier location 2702. Device 100 may be configured to determine that it has arrived at a supplier location either by utilizing the location detection subsystems of system 90 and by cross-referencing to the location information of route report 2202, or else device 100 may determine that it has arrived at a delivery destination when device is able to read a network identifier of LAN 1102 at the supplier facility 2702.

Figure 7D:
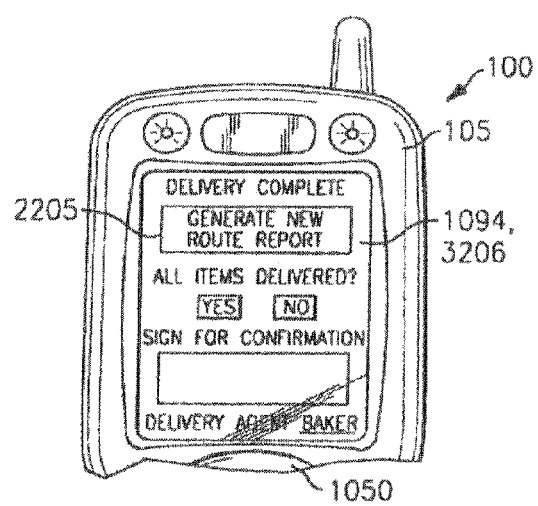

An example of a data entry screen 3206 which may be displayed on a display 1094 of device 100 when device 100 is at a location of supplier facility 2702 is shown in FIG. 7d. Data entry screen 3206 driven by form set 3016 requests an operator to confirm that all delivery destinations were delivered to. Data entry screen 3206 may also request an operator to enter a signature to confirm that all deliveries have been made.

Device 100 may be configured so that device 100 is automatically driven into other automatically executed modes of operation when device 100 carried by vehicle 402 returns to a supplier facility 2702. For example, device 100 may be configured so that when device 100 returns to supplier facility 2702, device 100 automatically sends a command to print a transaction record. As shown in FIG. 2a, supplier LAN 1102 may include a printer 1320. When device 100 determines that it has returned to a supplier LAN 1102, device 100 may send a print command to print a record of all of the transaction information collected at delivery destinations of a completed route. FIG. 18 shows a flow diagram describing operation of device 100 which automatically prints a transaction report when returning to a supplier facility 2702. Device 100 may also be configured so that when device 100 determines that it has returned to a supplier facility 2702, device 100 automatically sends all transaction data collected during the completed route to remote server 1850. If a LAN is detected and approved, device 100 establishes IP connectivity. Device 100 then formats and sends print jobs to an available network printer and transaction data to server 1850 and continues to do so until all reports have been printed and all transaction data has been transmitted.

Referring more specifically to the flow diagram of FIG. 18, system 90 can be configured so that device 100 at block 1702 determines whether supplier LAN 1102 at supplier facility 2702 has been detected. Such detection may be made in the following manner: where LAN 1102 is in accordance with the IEEE 802.11 Standard, device 100 can store in memory 1022 the set of one or more channels which access point 1360 is configured to broadcast on. When device 100 determines that it is in range of an access point broadcasting on the selected set of channels, device 100 determines that device 100 is in range of LAN 1102. At block 1704 device 100 determines whether device 100 is authorized to be connected to LAN 2702. For performance of such authorization device 100 may store a password corresponding to LAN 1102 enabling device 100 to be authorized. At block 1704 device 100 may send access point 1360 a password to indicate that device 100 is authorized to be attached in LAN 1102, and LAN 1102 (specifically access point 1360) in turn can send device 100 an indication that it is authorized to attached to LAN 1102. The process by which device 100 receives indication that it is authorized for attachment to LAN 1102 may include the use of industry standard security protocol(s) such as those specified in the IEEE 802.11i Standard. When LAN 1102 is a lower security network, the processing of block 1704 can be avoided. Also, rather than storing a "signature" set of channels which LAN 1102 is configured broadcast on, memory 1020 can store an SSID of LAN 1102. In a lower security implementation of LAN 1102 can be configured to repeatedly broadcast an SSID, and device 100 can be configured so that device 100 at block 1702 compares the memory stored SSID with a received SSID received from LAN 1102. When a received SSID matches the memory stored SSID, device 100 at block 1702 determines that device 100 has detected LAN 1102 at a supplier's facility. At block 1706 device 100 establishes IP connectivity with LAN 1102. Specifically, system 90 may be configured so that at block 1704 device 100 sends a DHCP request to access point 1360 for an IP address and access point 1360 responsively assigns an IP address to device 100. When device 100 receives an IP address from access point 1360, data packets transmitted to supplier access point 1360 are appropriately routed to printer 1320 and to remote server 1850 when such data packets are properly addressed with the respective IP addresses of printer 1320 and server 1850. At block 1708 device 100 formats a report and sends a print request to printer 1320 by addressing a command to printer 1320. Printing continues (as indicated by block 1710) until the last print job is complete (block 1712). At block 1714 device 100 formats all transaction data from the route just completed and sends the transaction data to server 1850. Data transmission continues (as indicated by block 1716) until the data transmission is complete (block 1716). According to the invention, system 90 can be configured so that delivery transaction data is sent by device 100 to server 1850 using a file format in accordance with the Extensible Markup Language (.XML files).XML files can be transmitted using the Hypertext Transfer Protocol (HTTP) or the File Transfer Protocol (FTP). Server 1850, in turn, can have an XML parser 1860 (FIG. 2b) for parsing the data of the .XML file. With .XML files, image data and other data can be readily combined either by referencing image file objects within the .XML file, or by encoding image data elements (e.g., color scale or gray scale pixel values) using XML elements. An example of an .XML file carrying transaction data is shown in FIG. 19. The steps of the flow diagram of FIG. 18b are executed automatically, i.e., without human manual control necessary to cause processing to proceed from step to step.

As indicated previously, device 100, in addition to or as an alternative to sending transaction data at the completion of a route, may be configured to send transaction data to server 1850 at the end of each delivery transaction so that device 100 sends complete transaction data to server 1850 at each individual delivery destination, e.g., A, B, C, D or a, b, c, d, e, 2704. At each individual delivery destination, when a transaction is complete, device 100 may send a complete transaction data to server 1850 through cellular network 1502 or via a network, e.g., network 1108, at the delivery destination.

Figure 14:
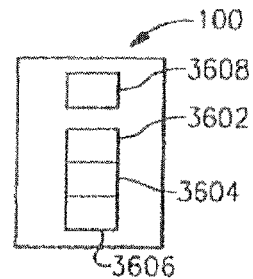
FIG. 14 is a software integration block diagram of an embodiment of the invention wherein a mobile device determines location by alternative methods.
Figure 15:
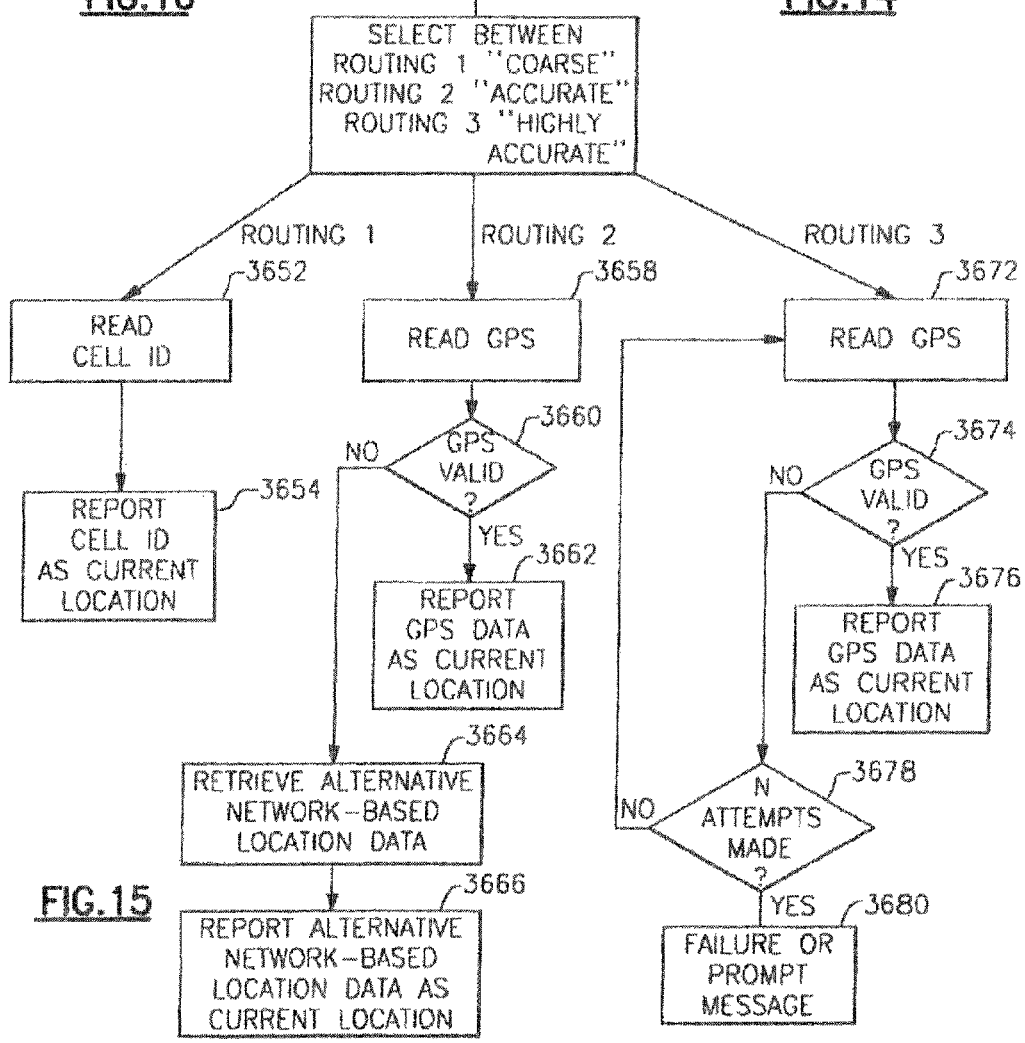
FIG. 15 is a flow diagram illustrating operation of an embodiment of the invention wherein a mobile device determines location by alternative methods.

In another aspect of the invention, device 100 is configured to automatically confirm that device 100 is in a state wherein device 100 is approaching supplier facility 1102 prior to automatically transmitting a command to network 2702 to print route report date or to upload data to remote server 1850 when returning to supplier facility 2702. For example, it may not be desirable for device 100 to spuriously generate a print command or data upload command on power up when in range of access point 1360, without device 100 having recently completed a delivery route. Accordingly, device 100 may incorporate a software implemented confirmation module 3608 (FIG. 14). Operating in accordance with confirmation module 3608, device 100 evaluates recently collected time stamped location data prior to enabling issuance of a print command or data upload command. The location information may be received from location detection unit 1280 or from network 1502, 1102, 1104 as has been described herein. Device 100 may evaluate two recently collected location data readings with reference to a stored location value for supplier facility 2702 in order to confirm that device 100 carried by vehicle 402 is approaching supplier facility 2702.

Referring again to the LAN detection process described relative to FIG. 18, the inventors noted that if device 100 is configured to continuously detect for the presence of LAN 1102, a significant amount of power and processing time may be consumed. Accordingly, in another aspect of the invention, device 100 can be configured to avoid detecting for the presence of LAN 1102 until such time that device 100 determines that device 100 is at a location proximate to LAN 1102. In one illustrative embodiment, device 100 incorporates a location determination circuit (satellite or network based) and stores in memory 1020 data (e.g., coordinate values) indicating the location of LAN 1102 at a supplier facility. The location determination circuit can determine a present location of device 100 by way of processing as described herein that includes the step of reading a Cell ID. Device 100 can be configured to read a present location value from the location determination circuit. Device 100 can also be configured so that if device 100 determines that device 100 is within a predetermined distance of LAN 1102, device 100 activates the LAN detection process described with reference to FIG. 18. Device 100 can also be configured so that if device 100 determines that if it is not within a predetermined distance of LAN 1102, device 100 avoids activation of the LAN detection process described in connection with FIG. 18 to conserve battery power and processor time.

In an important aspect of the invention in one embodiment, device 100 is not controlled to send complete transaction data to server 1850 until device 100 returns to supplier facility 2702. In many applications, article identification data that is collected by device 100 may be sensitive data which should be maintained in such memory locations that are inaccessible to the general population. According to the invention in one aspect, supplier LAN 1102 is equipped with security block 902 (FIG. 2b). Security block 902 includes tunneling features which operate to encrypt data presented to LAN 1102 for delivery to remote server 1850. Security block 902 may include VPN software modules as described in connection with FIGS. 20a and 20b. For providing secure data communications, server 1850 is equipped with suitable keys for recovering the encrypted data encrypted by operation of security block 902. LAN 1102 may also include firewalls preventing access to data stored in LAN 1102 by users of remote computer devices. With data communications being governed by security block 902 and complementary security features of LAN 1102, the resulting data communication network may be regarded as a private network or intranet.

According to the invention in one embodiment as discussed in connection with the flow diagram of FIG. 17a, device 100 may be configured to automatically send transaction data, such as transaction data for each transaction of a completed route, when device 100 returns to supplier facility 2702. In one embodiment, device 100, when returning to supplier facility 2702, automatically transmits data packets to secure LAN 1102 equipped with the above mentioned security features for transmission to server 1850.

In another security method that can be practiced with the invention, an encryption key can be hard wire injected into device 100 when device 100 is at supplier facility (e.g., when a route has been completed or before a route has begun). For example, a stand alone personal computer equipped with a key generating program can be provided at supplier facility 2702. Device 100 can be hard wire connected to the personal computer (e.g., with use of a point to point USB cable) to receive a generated encryption key. The key, in addition to being injected into device 100, can be injected into a processor of the supplier facility (e.g., server 1350). When device 100 is located a distance away from supplier LAN 1102, the key that is securely and hard wired injected into device 100 at supplier facility 2702 can be utilized to encrypt data packets that are addressed to a device of LAN 1102 and transmitted from device 100 over a remote LAN 1106, 1112, MAN 1104 or cellular network 1502 to LAN 1102 which decrypts the encrypted data utilizing the key which has also been securely injected into a processor of the supplier facility 1102.

Additional examples of data collection devices configured to establish operating characteristics based on received radio frequency communicated signals are described with reference to FIGS. 12-15. In the example of FIG. 12, a data collection device 100 in the form factor of a portable laptop personal computer is equipped with an RFID reader unit 1250, such as reader unit 1250 as described in connection with FIG. 1a. Data collection device 100 as shown in FIG. 12 is also equipped with a multiple user operating system such as WINDOWS XP. Multiple user operating systems support multiple users. Referring to system 90 shown in FIG. 2a, device 100 is incorporated into PC 1310 at supplier facility 2702, and into PC 1710 at delivery destination 2704 which can be e.g., a hospital or patient care center. Data collection device 100 may be a portable laptop personal computer (PC) as shown in FIG. 12 or else may be a desktop PC, or a data collection device in one of the form factors shown and described in connection with FIGS. 1f-1k; (i.e., a hand held portable device as shown in FIGS. 1g and 1h or a portable re-mountable transaction terminal device as shown in FIGS. 1i, 1j and 1k). Multiple user operating systems allow a "present user" setting of a computer device to be manually switched via a "switch user" control button 3402 as shown in FIG. 13a. In the present invention, a "present user" setting of a computer device can be automatically switched (i.e., with no manually input controls) responsively to a sensed user detected in the vicinity of the computer device, as well as being manually switched. Multiple user operating systems define different registry settings, file access capabilities including executable program access capabilities, and browser settings for different users. For example, when user A is selected as the present user setting and not user B, a different set of files including executable application programs may be made available for accessible execution by data collection device 100. A different set of file directories may be available when the designated present user setting is changed. Basic settings of data collection device 100 may change when a designated present user setting is changed. For example, registry settings such as the main menu wall paper and/or icon layout may be differentiated among different present user settings, or browser settings such as a selected homepage or the list of "favorite" Internet addresses in a browser program may change when a present user setting is changed. Referring to further aspects of the data collection device shown in FIGS. 12, and 13a, data collection device 100 can include display 1094, keyboard 1090, and a housing 105 which can house and support all of the components of FIG. 1a.

In accordance with the invention in one aspect, device 100 equipped with a multiple user operating system is made to automatically sense the presence of a new candidate user in the vicinity of device 100 by processing of decoded identification data output by RFID reader unit 1250 and to automatically change a present user setting of device 100 in response to a determination that a new authorized user has entered an area proximate computer device 100. The system can be configured so that RFID reader unit 1250 reads RFID tags 1262 within, e.g., 1 foot, 2 feet, 3 feet, 5 feet, 10 feet, 20 feet of housing 105 of device 100. An RFID tag can be regarded as being in the vicinity of (in proximity with) device 100 RFID reader unit 1250 when RFID reader unit 1250 of device 100 can read the tag (i.e., output a decoded out message corresponding to data encoded in the tag). With reference to FIG. 12, an employee 3502 may wear an employee identification card 1270 equipped with an RFID tag 1262. Card 1270 may also be carried in a wallet or a pocket of employee, or affixed to a bracelet. When employee 3502 enters an area in range of the sensing range of RFID reader unit 1250, device 100 determines that the specific employee is present and automatically sets the present user setting of device 100 to a setting in accordance with the sensed employee. Where device 100 draws unlimited wall outlet power, RFID unit 1250 is conveniently operated in an active reading state when used to auto sense an employee entering an area proximate to device 100.

Figure 13E:
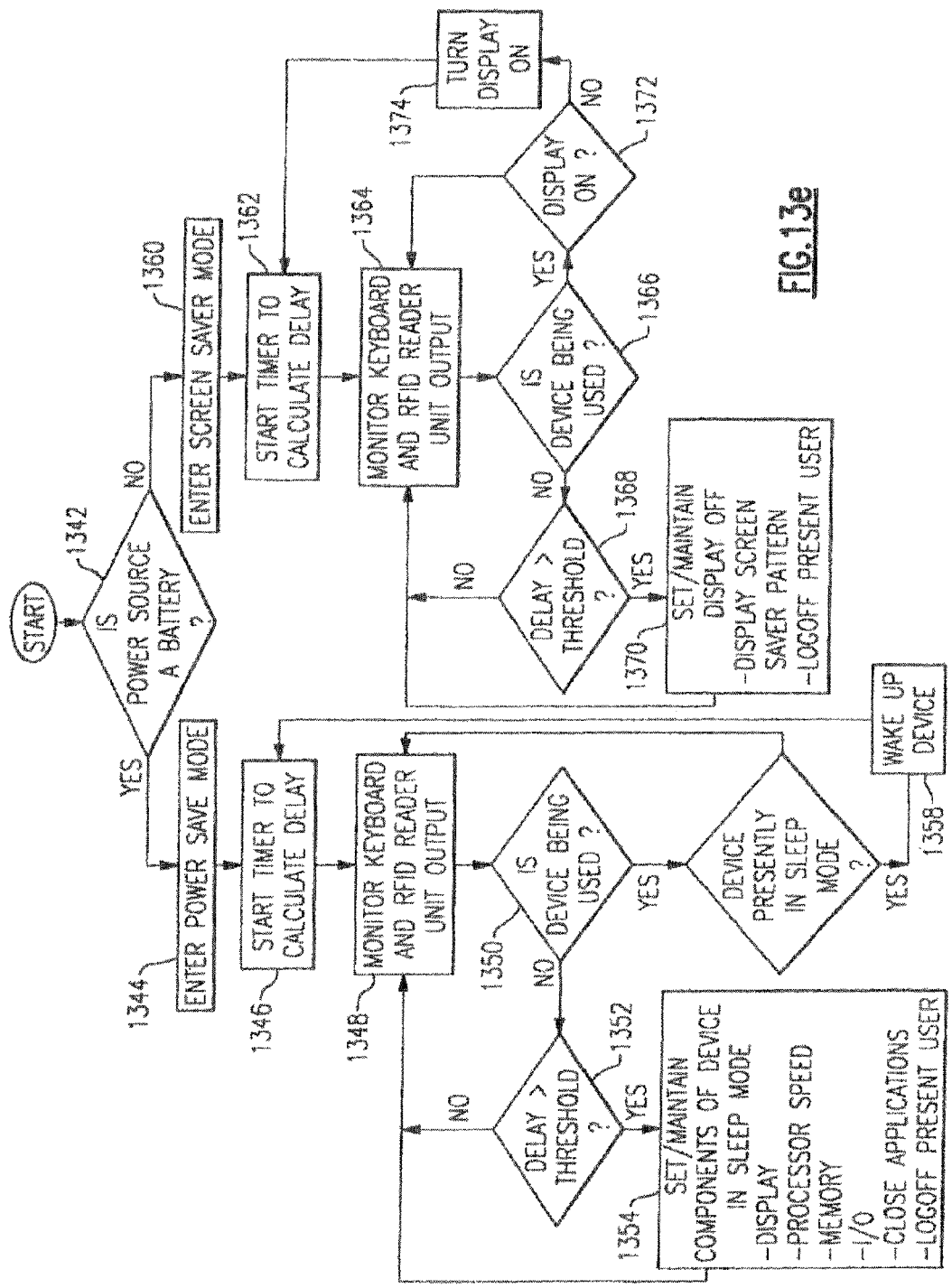
FIG. 13e is a flow diagram illustrating further aspects of a data collection device according to the invention incorporating an RFID reader unit, wherein the data collection device reads an output of an RFID reader unit and establishes sleep and screen saver modes of operation in a manner responsive to the output of the RFID reader unit.

An RFID based automatic login procedure is described further with reference to the flow diagram of FIG. 13b. At block 1302 device 100 determines whether an authorized user of device 100 is presently logged in and in the vicinity of device 100. Device 100 reads the output of RFID reader unit 1250 to determine whether a presently logged in user logged into computer device 100. If there is no presently logged in user, device 100 is driven into a state (block 1304) wherein device 100 waits for an RFID tag of a new candidate user to be detected. By refraining from detecting for new user RFID tags when a valid user is presently logged in, device 100 avoids spurious user switches which might otherwise be caused by a new valid user approaching the vicinity of device 100. While the flow diagram of FIG. 13b does not depict there being a reading or an output from RFID reader unit 1250 prior to block 1304, device 100 can in accordance with other concurrently run processes monitor an output of RFID reader unit 1250. For example, as part of a power save and screen saver process described in connection with FIG. 13e device 100 can monitor an output of RFID reader unit 1250 to determine whether the presently logged in user has vacated the vicinity of device 100 for more than a predetermined period of time and can automatically log out a presently logged in user on a determination that a presently logged in user has vacated the vicinity of device 100 for more than a predetermined period of time. Also, as is described herein, device 100 prior to execution of block 1304 can be monitoring the output of RFID reader unit 1250 to detect for the presence of a user having an identification or classification that has been assigned trumping status. Device 100 can be configured so that if a user is detected who has trumping status, the user is automatically logged in notwithstanding there being a presently logged in user. At block 1306 device 100 reads user identification data from RFID tag 1262 and at block 1308 determines whether the tag data is valid. At block 1310 device 100 presents user identification information and security information to a security manager (e.g., a server 1750 in communication with device 100, 1710 as shown in FIG. 2a). At block 1312 device 100 determines whether the tag data indicates that an authorized user approved for using device 100 has entered the vicinity of device 100. At block 1314, if the decoded out message data decoded from an encoded RFID tag indicates that an authorized user is present, device 100 logs in the user, sets the "present user" setting of device 100 and loads in appropriate permissions (e.g., program and file permissions) based on which user has been detected. At block 1316 device 100 determines whether the user has completed a predetermined transaction or has vacated the vicinity of device 100. At block 1316 and repeatedly throughout the time that device 100 is configured for use by a particular user, device 100 may repeatedly attempt to re-read RF ID tag 1262 in order to confirm that the particular user is still in the vicinity of device 100. If device 100 determines at block 1316 that a presently logged in user has conducted a transaction, has affirmatively logged out of device 100 or has vacated the vicinity of device 100, device 100 proceeds to block 1318. At block 1318 device 100 logs off the user (if the logged in user has not affirmatively logged off) and returns to block 1302. Device 100 can be configured so that the steps of the flow diagram of FIG. 13b are executed automatically i.e., without human manual control needed to advance processing to a next step.

In one embodiment, the RFID based auto-login procedure can be implemented in Windows XP. The login system for Windows XP is comprised of three components: the Winlogon executable, a Graphical Identification and Authentication dynamic-link library (GINA), and network providers. GINA and Winlogon have an Application Program Interface (API) that can be used to program them and implement customized login routines. Winlogon essentially behaves as a state machine that loads the GINA DLL and calls functions implemented by GINA when it transitions between states. The initial state of Winlogon will indicate that no user is currently logged in. GINA will be called to drive device 100 into a state wherein device 100 waits for a valid RFID card to be presented. GINA may output an audio or video prompt on display 1094 (FIG. 13b) requesting an employee to present a valid RFID or else may avoid such output. As explained in connection with the flow diagram of FIG. 13b, tag reading may be carried out repeatedly. When an RFID tag is presented, the custom GINA will attempt to process decoded out RFID tag message data to determine if the tag is valid. If the tag is not valid, it will return a failure token to Winlogon and return to the prompt. If the tag is valid, then GINA will use the decoded out message data decoded from the tag to authenticate the user and determine if the user is authorized to use the device 100, e.g., by presenting decoded tag message data to a security manager that can be incorporated in a server such as server 1750, shown in FIG. 2a. If the tag is determined to not be valid, GINA will again return a failure token to Winlogon and return to the initial prompt. If the authentication and authorization check are successful, then GINA will return a success token to Winlogon. Winlogon will then configure an access control list for the given user and set up a default desktop. Winlogon will then switch its state to indicate a login and return to GINA to have it set up the user's shell. GINA will return to Winlogon after setting up the user's shell and Winlogon will wait for further commands. Winlogon can be configured to remain in this state until the RFID tag is no longer sensed by the Operating System (OS) and then a call will be made to logout. Winlogon will then turn to GINA to logoff the user, and return device 100 to the state wherein device 100 waits for a valid RFID card or new user to be presented.

As part of the login profile, device 100 can be configured so that a particular application is driven open when a particular employee is detected to be in the vicinity of device 100. For example, device 100 can have stored in a memory thereof the LANDESK Management Suite from Intel, Inc. including the executable IT management application file LDCMCLIENT.EXE. Device 100 can be configured so that device 100 automatically executes an Information Technology ("IT") management application program where device 100 determines that a certain employee (e.g., where the certain employee is classified as an "IT" employee) is in the vicinity of device 100 and responsively changes a "present user" setting of device 100 to a setting corresponding to the employee determined to be in the vicinity of device 100.

In another aspect of the invention, a system 90 (FIG. 2a) having device 100 incorporating RFID reader unit 1250 and a multiple user operating system can be configured to operate in accordance with the flow diagram of FIG. 13b except a "present user" setting of device 100 is a user classification and not an individual user (block 1314 of the flow diagram of FIG. 13b device 100 can load appropriate permissions based on "user classification" rather than on "user"). In one illustrative embodiment of the invention, each employee of a set of N individual employees can be assigned one of M employee classifications and device 100 can be configured to have M possible present user settings, each user setting corresponding to one of the possible employee classification. Referring to employee classification table 1324 shown in FIG. 13c, employees (taking in the illustrative embodiment a set of employees at a hospital or another patient care center) can be classified into one of M classifications including the classification "Doctor," the classification "Nurse," and the classification "IT," for employees specializing in Information Technology. Employees involved in managing and servicing a facility's computers and computer networks can be classified as "IT" employees. Referring to user setting table 1326 a present user classification of device 100 can be established based on the classification of the employee presently in the vicinity of device 100.

In one illustrative embodiment table 1324 and table 1326 can be included in a memory of system 90 as shown in FIG. 2a (e.g., memory 1020 of device 100 or at a spaced apart server such as a local server 1750 where device 100 is incorporated in a computer device at LAN 1108 such as PC 100, 1710, or at a remote server relative to server 1750, e.g., server 1850 or server 1950). In operation, device 100 reads decoded employee code ID message data output by RFID reader unit 1250, and, applying the decoded employee code ID message data as a key utilizing table 1324 determines a particular employee classification for the particular employee (e.g., "Doctor," "Nurse," or "IT"). Device 100 then applies the determined employee classification as a key utilizing table 1326 to determine a present user setting for device 100. Referring to the table of FIG. 13d, device 100 sets a present user setting of device 100 to "Doctor Users" if device 100 determines that an employee in the vicinity of device 100 is a doctor. Device 100 sets a present user setting of device 100 to "Nurse Users" if the device 100 determines that an employee in the vicinity of device 100 is a Nurse. Device 100 sets a present user setting of device 100 to "IT Users" if the computer device determines that an employee in the vicinity of device 100 is an IT classified employee.

As indicated by table 1326, each designated present user setting can have an associated application which is automatically executed when a particular user setting is set. With reference to table 1326, a browser application is executed (e.g., WINDOWS INTERNET EXPLORER) when device 100 sets a present user setting to "Doctor Users." Device 100 can be configured so that when executed the browser application may automatically display a web page stored in a remote server such as server 1850 or server 1950 where servers 1850 and 1950 represent servers maintained and operated by a supplier of prescription drugs (i.e., a device 100 can be configured so that prescription drug ordering web page is automatically displayed when an employee classified as a doctor is detected to be in the vicinity of device 100).

With further reference to table 1326, a database application is executed e.g., an executable software module of the EMR/EITR medical office records software package available from SOFTAID of Miami, Fla. when device 100 sets a present user setting to "Nurse Users." Device 100 can be configured so that when executed the database application automatically opens a database containing treatment records of patients treated at the patient care facility 2704. The database can be stored in server 1750 of local area network 1108. Referring to table 1326, device 100 can be configured to that more than one application is automatically executed when a "present user" setting is changed. As indicated by the table, device 100 can be configured so that a database application for accessing patient records and a browser application for accessing a prescription drug web page are automatically executed when a "present user" setting is changed to "doctor."

System 90 can be configured so that certain users having a specific user identification or users falling within a certain user classification are assigned trumping status over other users or user classifications. Referring to the flow diagram of FIG. 13b, it may be advantageous for device 100 to determine whether a presently logged in user is in the vicinity of the device before detecting for new users to avoid spurious unwanted switches of a designated "present user" of device 100. However, it may be advantageous to configure system 90 so that notwithstanding the general rule that a user entering the vicinity of device 100 cannot cause a change in the "present user" setting of device 100, unless the device has determined that there is presently no logged in user, certain users or classification of users can cause a change in a "present user" setting of device 100 merely by moving into the vicinity of device 100 as detected by RFID reader unit 1250 in spite of a presently logged in user being in the vicinity of device 100. In one embodiment, the company President is assigned trumping status so that at block 1302 device 100 determines whether the President is present and advances to block 1306 and remaining blocks to validate the tag data, conduct an authorization check and log in the President-user. In another embodiment "doctor users" are assigned trumping status over other classifications of users so that at block 1302 device 100 determines whether a user falling into the "doctor" classification is present so that device 100 advances to block 1306 and remaining blocks to validate the decoded out tag data, conduct an authorization check and log in the detected user having the "doctor" classification where an output of RFID reader unit 1250 indicates that a user having "doctor" classification is in the vicinity of device 100. In yet another embodiment "IT users" are assigned trumping status over other classifications of users so that at block 1302 device 100 determines whether a user falling into the "doctor" classification is present so that device 100 advances to block 1306 and remaining blocks to validate the decoded out tag data, conduct an authorization check and log in the detected user having the "IT" classification where an output of RFID reader unit 1250 indicates that a user having "IT" classification is in the vicinity of device 100.

With further reference to table 1326, an IT management application is executed (e.g., LDCMCLIENT.EXE) when device 100 sets a present user setting to "IT Users." Device 100 can be configured so that when executed the management application automatically displays a graphical user interface displaying information respecting LAN 1108 and enabling the IT employee to make selections provided by the IT management application.

With reference to FIG. 2a, more than one device 100 configured in accordance with device 100 in the embodiment of FIGS. 12-13e and having an RFID reader unit 1250 and multiple user operating system can be deployed at a given data collection facility. Referring to data collection facility 2704 of FIG. 2a, data collection facility 2704 includes four computer devices configured as described in connection with FIGS. 12-13e; namely, device 100-1, device 100-2, device 100-3 and device 100-4. Device 100-1 is provided by desktop PC, device 100-2 is in the form factor of a portable laptop PC, and device 100-3 is in the form factor of a hand held portable data terminal as shown and described in connection with FIGS. 1g and 1h, and device 100-4 is in a form factor of a portable re-mountable transaction as shown and described in connection with FIGS. 1i-1k. In the illustrative embodiment of FIG. 2a, tables 1324 and 1326 can be stored in server 1750 spaced apart from devices 100 so that tables 1324 and 1326 are readily accessible by each of the plurality of RFID reader unit equipped computer devices 100-1, 100-2, 100-3, 100-4. While the RFID reader unit 1250 of a device 100 described herein has been described as being contained within housing 105 that commonly houses processor IC chip 1030 operating in accordance with a device operating system and RFID reader unit 1250, the RFID reader units 1250 of each device 100 can also be located external to housing 105 provided an output of the RFID reader unit 1250 indicates whether there is an RFID tag in the vicinity of housing 105. Other objects of system 90 can also be stored in server 1750 spaced apart from devices 100-1, 100-2, 100-3, and 100-4. For example, as has been indicated server 1750 can store a database of patients cared for at facility 2704.

In the embodiments thus far described, device 100 incorporates a multiple user interface, and selection of a new "present user" setting can drive the automatic execution of a particular executable application that is associated with that particular user setting. In an alternative embodiment the invention is practiced with use of one or more of a device 100 that has a single user operating system. In the single user operating system embodiment, device 100 can be configured so that the detection of a particular employee or a determination that an employee of a particular employee classification is in the vicinity of device 100 causes automatic execution of a particular application associated with that employee or employee classification without causing a designated present user setting of device 100 to change (there being only one possible present user in the alternative embodiment).

In another aspect, data collection device 100 can be configured so that data collection device 100 monitors an output provided by a reader unit 1250 when operating in accordance with the power save mode of operation and/or operating in accordance with a screen saver mode of operation. Aspects of the invention, in one embodiment, are described with reference to FIG. 13e illustrating operation of device 100 when operating in accordance with the power save mode and a screen saver mode.

As explained with reference to FIG. 1a, data collection device 100 can include a power management circuit 415 which supplies power to circuit boards 108 of data collection device 100 and receives power from one of three power sources, namely serial power source 416 (e.g., USB), a battery power source 417, normally a rechargeable battery and a transformer based AC/DC power source 418.

Referring now to the flow diagram of FIG. 13e, data collection device 100 at block 1342 determines whether device 100 is currently powered utilizing a battery power source 417 or (permanent power sources) 416 or 418. If device 100 at block 1342 determines that device 100 is currently powered by battery power source 417, device 100 precedes to block 1344 to enter a power save mode of operation. At block 1346 device 100 starts a timer to calculate a delay. In executing block 1346 device 100 may utilize real time clock 1013, e.g., by sending a command to real time clock 1013 to start a timer calculation. At block 1348 device 100 monitors input received from keyboard 1090 and RFID reader unit 1250. The generation of an output by either of keyboard 1090 or RFID reader unit 1250 can indicate that an employee is presently in the vicinity of device 100. At block 1350 data collection device 100 determines whether device 100 is presently being used by a user. For example, at block 1350 device 100 can determine that device 100 is presently being used if keyboard 1090 at monitoring block 1346 generates an output indicating that a keystroke has been made. Device 100 at block 1350 can also determine that device 100 is presently being used if at monitoring block 1348 RFID reader unit 1250 produced an output indicating that a user presently logged into device 100 remains in the vicinity of device 100 or that another employee is in the vicinity of device 100. At block 1352 data collection device 100 determines whether the present delay is greater than a threshold delay. The threshold delay can be set with a setting in a system registry. If the present delay, the calculation of which was started at block 1346, is greater than the threshold delay then device 100 returns to block 1348 to again monitor keyboard 1090 and RFID reader unit 1250. Examples of thresholds which may be compared to a presently calculated delay at block 1352 are, e.g., five minutes, ten minutes, half hour, forty-five minutes, one hour. If at block 1352 device 100 determines that the presently calculated delay is greater than the threshold delay then device 100 advances to block 1354 to set components of the device or to maintain the components of the device in a sleep mode. In a sleep mode the configurations of various components of devices are reconfigured so that they utilize a reduced amount of power or no power. For example, in a sleep mode a display 1040 can be turned off so that it displays only a screen saver pattern or no pattern. The processor speed of processor IC chip 1030 can be reduced. The access of processor IC chip 1030 to various memories of device 100 can be eliminated. I/O ports of device 100 can be rendered unavailable and applications currently being executed by device can be closed down. Referring again to block 1350, if data collection device 100 at block 1350 determines that device 100 is, in fact, currently being used then device 100 proceeds to block 1356 to determine whether device 100 is presently in a sleep mode, as explained with reference to block 1354. If the device 100 is presently in a sleep mode device 100 advances to block 1358 to wake up the device 100, i.e., return the various components of the device 100 to a fully active state and then proceeds to block 1346 to start another timer calculation delay utilizing real time clock 1013. If at block 1356 device 100 determines that the device 100 is not presently in a sleep mode device 100 advances to block 1348 to again monitor outputs of keyboard 1090 and RFID reader unit 1250.

Referring again to block 1342, if device 100, at block 1342, determines that device 100 is presently not being powered by a battery 417, i.e., being powered by a "permanent" power source, device 100 advances to block 1360 to commence operation in a screen saver mode. Referring to the screen saver mode of operation, device 100 at block 1362 starts a timer to calculate a delay utilizing real time clock 1013 in the manner described previously in connection with block 1346. With the timer calculation being started device 100 proceeds to block 1364 to monitor keyboard 1090 and RFID reader unit 1250 in the manner described previously in connection with block 1348. Device 100 then proceeds to block 1366 to determine whether device 100 is presently being used. As explained in connection with block 1350, device 100 can determine that device 100 is currently being used, if for example, the monitoring block 1364 device 100 determined that keyboard 1090 produced an output indication of a keystroke being made or that an output of RFID reader unit 1250 indicated that a user presently logged into device 100 is presently in the vicinity of device 100 or in an alternative embodiment that an employee (who may or may not be the presently logged in user) is in the vicinity of data collection device 100. If device 100 at block 1366 determines that the device 100 is not presently being used device 100 advances to block 1368 to determine whether the present delay, the calculation of which was commenced at block 1362, is greater than a threshold delay. The threshold with reference to block 1368 may be set as a registry setting and may be, e.g., five minutes, ten minutes, thirty minutes, an hour, etc. If device 100 at block 1368 determines that the presently calculated delay is greater than a threshold delay device 100 proceeds to block 1370 to set or maintain display 1094 in an off state. In an off state, as referred at block 1370, the windows and icons normally displayed by display 1094 are not displayed, but rather the screen saver pattern is displayed by display 1094. After executing block 1370 device 100 returns to block 1364 to again monitor the outputs of keyboard 1090 and RFID reader unit 1250. If data collection device 100 at block 1366 determines that device 100 is in fact presently being used, device 100 proceeds to block 1372 to determine whether display 1094 is presently on. If display 1094 is not presently on, i.e., is presently displaying a screen saver pattern device 100 proceeds to block 1374 to turn display 1094 on so that display displays its normal collection of, e.g., windows, icons, signature entry prompts or pin entry prompts. After executing block 1374 device 100 returns to block 1362 to start another timer delay calculation utilizing real time clock 1013. If at block 1372 device 100 determines that display 1094 is presently on device returns to block 1364 to again monitor outputs of keyboard 1090 and RFID reader unit 1250.

Referring again to block 1354, device 100 at block 1354 may enter an operating mode referred to as the "hibernate" operating mode where an operating system of device 100 is the WINDOWS XP operating system available from Microsoft, Inc. Referring again to block 1358, it has been described herein that a monitoring of an output of RFID reader unit 1250 by data collection device 100 can cause device 100 to return to an active operation state from a hibernate operating state. In another embodiment of the invention, device 100 is configured so that a monitoring of RFID reader unit 1250 by device causes device 100 to change an operating state from powered down operating state to a powered up operating state. For example, data collection device 100 can be configured so that in a powered down mode sufficient power continues to be delivered to RFID reader unit 1250 such that RFID reader unit 1250 can detect the present of an employee in the vicinity of device 100 (e.g., within six inches of device 100, one foot of device 100, three feet, five feet, ten feet, etc.). Device 100 can be configured so that if RFID reader unit 1250 determines that an employee is in the vicinity of device 100 while device 100 is powered down device 100 automatically changes its operating state from a powered down operating state to a power up operating state. Ina powering up stage device 100 executes a boot up routine to load an Operating System (e.g., WINDOWS XP) into RAM 1021 so that the functionality of processor IC chip 1030 is in accordance with the loaded Operating System.

With further reference to the flow diagram of FIG. 13*e*, the execution of sleep mode block 1354 and screen saver mode block 1370 can be accompanied by steps to log off the presently logged in user. Referring to the flow diagram of FIG. 13*b*, a logging off of a presently logged in user can occur automatically in response to a determination that a logged in user has left the vicinity of device 100.

It has been described that system 90 is configured to detect a location of an individual mobile device 100 of system 90 by operating a variety of alternative location detection subsystems. Device 100 may be equipped with a satellite based location detection system provided by location detection unit 1280 e.g., GPS radio operating in communication with satellites 1606, 1608, 1610, and 1612. Device 100 may also be configured to receive location information from cellular network 1502 or from another network e.g., networks 1104 and 1112. Device 100 may be configured to process coarse location information (e.g., a coarse location coordinate value) from a Cell ID received from cellular network 1502.

However, actuating location detection unit 1280 when provided by a GPS receiver consumes power and time in the derivation of location signals, and further is susceptible to interference failures (e.g., when indoors or in the vicinity of tall buildings). While the Cell ID value retrievable by device 100 provides useful location information with negligible power draw (since it utilizes a radio already in use) and without dedicated location-determining hardware being incorporated into device 100, the Cell ID derived location information is accurate only to a tolerance of about 3000 m.

Figure 16:
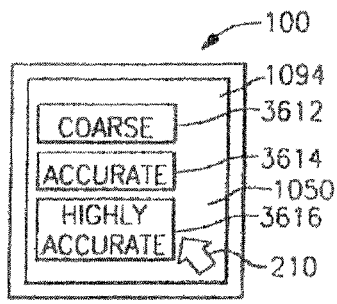
FIG. 16 shows an exemplary GUI menu option display screen associated with the flow diagram of FIG. 15.

In another aspect, device 100, as explained with reference to FIG. 14, is equipped to operate in accordance with a plurality of selectively actuatable location determination routine modules 3602, 3604, and 3606 which may be selectively actuated by an operator. Various location determination routine modules are explained with reference to the flow diagram of FIG. 15. When module 3602 is selected (the "coarse" location determination routine), device 100 simply reads the current Cell ID at block 3652 and at block 3654 simply reports location based on the current Cell ID (e.g., through table look up) as the current location of device 100 without attempting to utilize any other network based location service or satellite based location determination functionality. When module 3604 (the "accurate" location routine module) is selected, device 100 at block 3658 attempts to determine a location by processing at block 3658 of a current GPS signal. If the GPS data is valid (block 3660), device 100 reports the GPS data as the present location. If the GPS data is not valid (block 3660), device 100 proceeds to block 3664 to attempt to retrieve (block 3664) location information utilizing an alternative network based location service that is more accurate than the Cell ID location service (for example, the MATRIX service by Cambridge Positioning Services, Inc.). At block 3666, device 100 outputs the alternative network based location value as the present position. If the "high accuracy" location routine determination module is selected (module 3606), device 100 attempts to determine location based on GPS data and does not report a position value unless the location data is based on processing of signals from GPS unit 1280. At block 3672, device 100 reads presently available GPS data and at block 3674 makes a determination as to the validity of the data. If the present GPS data is valid, device 100 reports the GPS position data at block 3676 as the present position of device 100. If GPS data is not valid, device 100 may make N−1 additional attempts to receive location information from GPS unit as is indicated by block 3678. If, after several attempts, valid GPS location data is not obtained, device 100 reports a failure message at block 3680, or alternatively, displays on display 1094 series of prompt messages (e.g., move device 100 outdoors to retrieve location information) encouraging a user to position device 100 so that valid GPS data is more likely obtained. Alternately, at block 3672 as part of the execution of "highly accurate" location determination routine, device 100 may attempt to derive an "assisted GPS" location data read based on a processing of both satellite derived location information and network derived location information, and may issue a failure message at block 3680 if such an attempt is not successful. As indicated by FIG. 16, the above location determination route routines may be presented as GUI menu options so that an operator selects a desired module by clicking on one of appropriate icons 3612, 3614, and 3616.

An operator such as a delivery agent may select an appropriate location determination routine module based on a current location of device 100 within a route and further based on characteristics of the route. If the route is a local delivery route, and delivery destination locations a, b, c, d, and e may be meters away from another, module 3606, "high accuracy" location determination may be selected. If a delivery vehicle is at a location intermediate between two delivery locations that are tens or hundreds of miles apart (e.g. between delivery destination C and D in the regional non-local delivery route described with reference to FIG. 3a), coarse location determination may be suitable and an operator may select module 3602 for "coarse" location determination.

In another aspect of the invention, device 100 may be configured so that the location determination routine module 3602, 3604, 3606 which is activated for calculating a location of device 100 is dynamically responsive to a sensed condition, e.g., a sensed location of device 100. With reference to the regional delivery route example of FIG. 3a and the local delivery route example of FIG. 3b, device 100 can be configured to examine both route report data and present location information so that the location determination routine module 3602, 3604, 3606 that is activated is responsive to a sensed location of device 100 along a scheduled delivery route. For example, device 100 can be configured so that when device 100 carried by vehicle 402 is intermediate of scheduled delivery locations, e.g., at locations proximate a mid point between locations A and B, or a and b, "coarse" location determination routine module 3602 is automatically activated to the end that a location of device 100 is estimated based upon a Cell ID. Device 100 can further be configured so that when device 100 reaches a location designated as being proximate to a next delivery location, i.e., location B or b where device 100 is traveling from location A or a, device 100 automatically activates "highly accurate" location determination routine module 3606. Device 100 receives location information by processing of GPS signals or receives from a network location information derived from processing a combination of satellite derived and network derived location data. Configuring device 100 so that an activation of a particular one of location determination routine modules 3602, 3604, 3606 is responsive to a sensed condition can conserve power by reducing the number of calculations and data transfers necessary to extract location data and can reduce cost in that network providers can be expected to charge higher service fees for providing higher accuracy location readings. The range determined to be a range proximate a destination location can depend on additional parameters of the particular route. For example, in a regional or national route, the location of one to five miles from a delivery destination may be regarded as and designated as a location proximate a next delivery location while in a local delivery route a location of e.g., 500 feet may be designated as a location that is proximate a next delivery location.

In view of the description and drawings herein, an object of the invention is to provide: (1) a bar code reading data collection device for operation in a system having a plurality of networks, and a remote server incorporated in one of said networks, said data collection device comprising: (a) a hand held housing; (b) an imaging assembly supported by said hand held housing including a solid state image sensor and an imaging lens focusing an image onto an active surface of said solid state image sensor; (c) a display disposed in said housing; (d) a user interface including a trigger and at least one of a touch screen or keyboard for entering data into said data collection device and for selecting between modes of operation of said device; (e) wherein said data collection device is operable in a first bar code reading mode wherein said data collection device captures an electronic image representation, attempts to decode a bar code symbol represented in said electronic image representation and outputs a decoded out message in response to said trigger being actuated, a second, picture taking mode of operation wherein said data collection device outputs an electronic representation without outputting a decoded out message in response to said trigger being actuated and a third data entry mode in which said data collection device displays on said display a series of instructions respecting a manner in which data is to be entered into said device, wherein at least said first and second modes are selectable by a user via input of commands into said user interface; (f) a first location determination circuit comprising a location detection unit incorporated into said housing, said location detection unit including a radio transceiver configured to receive radio signals from series of satellites, said location detection unit producing location information indicating a location of said device; (g) a second location determination circuit enabling said data collection device to receive location information without processing of signals from orbiting satellites; (h) wherein said device is configured to receive from said remote server route reports indicating delivery destinations of said device; and (i) wherein said device is configured to compare location information from at least one of said first location detection circuit and said second location device circuit to locations of said delivery destinations of said report, and to automatically change a mode of operation of said device to said third mode in response to a determination by said control circuit that said device has arrived at a delivery destination identified in said route report.

A further object of the invention is to provide: (2) a bar code reading data collection device for operation in a system having a plurality of networks and a remote server incorporated in one of said networks, said data collection device comprising: (a) a hand held housing; (b) an imaging assembly supported by said hand held housing including at least one of (i) a combination of an image sensor and an imaging lens focusing an image onto an active surface of said solid state image sensor; and (ii) a laser scan engine; (c) a display disposed in said housing; (d) a user interface including a actuator mechanism and at least one of a touch screen and keyboard for entering data into said data collection device and for selecting between modes of operation of said device; (e) a control circuit in communication with said imaging assembly and said user interface, said control circuit being configured to operate in a mode in which said control circuit captures an image and decodes a bar code represented in said captured image in response to said trigger being actuated; (f) a location determination circuit enabling said data collection device to receive location information respecting a present location of said data collection device; (g) a plurality of data entry form sets stored in a memory of said bar code reading device, each driving a unique data entry screen sequence of said device; (h) a route report stored on said memory, said report storing a series of planned destinations of said device (i) a route report parser for parsing data of said route report; (j) wherein said device is configured to compare location information from said location detection circuit to said destinations of said route report and to automatically execute one of said form sets when said device determines that said device is presently located at one of said delivery destinations.

A further object of the invention is to provide: (3) a computer device comprising: (a) a display; (b) a control circuit in communication with said display; (c) an RFID reader unit disposed in communication with said control circuit, said RFID reader unit having an RF oscillator and receiver circuit and a data decode circuit, wherein said control circuit operates said RF reader unit in a continuous read mode, wherein said RF ID reader unit continuously broadcasts a radio signal in an attempt to activate an RFID tag brought into proximity with said computer device; (d) a browser program, a file system and multiple user operating system incorporated into said computer device, said multiple user operating system supporting a plurality of different present user settings, wherein multiple user supporting operating system configures said computer device so that at least one of files including executable programs that can be accessed, registry settings and browser settings are differentiated on the basis of said present user setting; (e) wherein said computer device is configured to operate in a mode in which said control circuit monitors data output by said RFID reader unit to confirm that a presently logged in user corresponding to said present user setting remains in a vicinity of said computer device; and (f) wherein said computer device automatically logs off said presently logged in user if said computer device determines that said presently logged in user has vacated a vicinity of said computer device.

A further object of the invention is to provide: (4) a computer device comprising: (a) a display; (b) a control circuit in communication with said display; (c) an RFID reader unit disposed in communication with said control circuit, said RFID reader unit having an RF oscillator and receiver circuit and a data decode circuit, wherein said control circuit operates said RF reader unit in a continuous read mode, wherein said RF ID reader unit continuously broadcasts a radio signal in an attempt to activate an RFID tag brought into proximity with said computer device; (d) a browser program, a file system and multiple user operating system incorporated into said computer device, said multiple user operating system supporting a plurality of different present user settings, wherein multiple user supporting operating system configures said computer device so that at least one of files including executable programs that can be accessed, registry settings and browser settings are differentiated on the basis of said present user setting; (e) wherein said computer device is configured to operate in a mode in which said control circuit monitors data output by said RFID reader unit to determine whether a new user has entered a vicinity of said computer device, and automatically sets a present user setting of said computer device to a present user setting corresponding to said new user if said computer device determines that a new user has entered a vicinity of said computer device.

In addition, an object of the invention is to provide: the computer device of (4), wherein said computer device is configured so that said computer device enters said operating mode in which said control circuit determines whether a new user has entered a vicinity of said data collection device if said computer device determines that there is no presently logged in user of said computer device.

In addition, an object of the invention is to provide: the computer device of (4), wherein said computer device is in communication with a lookup table correlating users with user classifications and wherein said present user setting of said computer device is a user classification setting.

In addition, an object of the invention is to provide: the computer device of (4), wherein said control circuit and said RFID reader unit are commonly housed.

A further object of the invention is to provide: (5) a system for automatically controlling operation of at least one computer device at a facility, said system comprising: (a) a first computer device including a display, a control circuit in communication with said display, an RFID reader unit disposed in communication with said control circuit, a browser program, a file system and multiple user operating system incorporated into said computer device, said multiple user operating system supporting a plurality of different present user settings, wherein multiple user supporting operating system configures said computer device so that at least one of files including executable programs that can be accessed, registry settings and browser settings are differentiated on the basis of said present user setting; wherein said control circuit of said first computer device monitors data generated by said RFID reader unit to read decoded RFID data from RFID tags carried by workers at said facility entering a vicinity of its respective computer device, said first computer device being selected from the group consisting of a laptop personal computer having said display integrated therein, a desk top personal computer, a hand held device having said display integrated therein, and a transaction terminal having said display integrated therein; (b) a second computer device including a display, a control circuit in communication with said display, an RFID reader unit disposed in communication with said control circuit, a browser program, a file system and multiple user operating system incorporated into said computer device, said multiple user operating system supporting a plurality of different present user settings, wherein multiple user supporting operating system configures said computer device so that at least one of files including executable programs that can be accessed, registry settings and browser settings are differentiated on the basis of said present user setting; wherein said control circuit of said second computer device monitors data generated by said RFID reader unit to read decoded RFID data from RFID tags carried by workers at said facility entering a vicinity of its respective computer device, said second computer device being selected from the group consisting of a laptop personal computer having said display integrated therein, a desk top personal computer, a hand held device having said display integrated therein, and a transaction terminal having said display integrated therein; (c) a server spaced apart from said computer devices, and being in communication with each said first and second computer devices; (d) a lookup table incorporated in said system correlating identifications for individuals working at said facility with user classifications for said individuals working at said facility; (e) wherein said first computer device is configured to operate in a mode in which said first computer device reads a decoded RFID message to determine an identification of an individual in a vicinity of said first computer device and further determines a user classification corresponding to said identification utilizing said lookup table; (f) wherein said first computer device is further configured to set said present user setting of said first computer device in a manner that is responsive to said determination of user classification.

A further object of the invention is to provide: (6) a bar code decoding data collection device for use in assisting record keeping attendant to a delivery on an article from a supplier location to a destination location and back to said supplier location; said bar code decoding data collection device comprising: (a) a hand held housing; (b) an imaging assembly supported by said hand held housing including at least one of (i) a combination of an image sensor and an imaging lens focusing an image onto an active surface of said solid state image sensor; and (ii) a laser scan engine; (c) a display disposed in said housing; (d) a user interface including a trigger and at least one of a touch screen and keyboard for entering data into said data collection device and for selecting between modes of operation of said device; (e) a bar code decoding data collection device, said bar code decoding data collection device being configured to operate in a mode in which said bar code decoding data collection device captures an electronic image representation and decodes a bar code represented in said captured image in response to said trigger being actuated; (f) a location determination circuit outputting location information respecting a present location of said bar code decoding data collection device; (g) a data entry form stored in said memory which when actuated drives a data entry screen; (h) a print command module stored in said memory which when actuated causes said bar code reading data collection device to send a command to print a report respecting a delivery; (i) wherein said bar code decoding data collection device monitors received location information output by said location determination wherein said bar code decoding data collection device at least one of (i) automatically executes said data entry form when said bar code decoding data collection device determines that said bar code decoding data collection device has arrived at said delivery destination, and (ii) automatically actuates said print command module when said bar code decoding data collection device has determined that said bar code decoding data collection device has returned to said supplier location from said delivery destination location.

A further object of the invention is to provide: (7) a bar code reading data collection device for operation in a data collection system having a remote server, said data collection device comprising: (a) a hand held housing; (b) an imaging assembly supported by said hand held housing including at least one of (i) a combination of an image sensor and an imaging lens focusing an image onto an active surface of said solid state image sensor; and (ii) a laser scan engine; (c) a display disposed in said housing; (d) a user interface including a trigger and at least one of a touch screen and keyboard for entering data into said data collection device and for selecting between modes of operation of said device; (e) a credit card reader unit incorporated in data collection device, said credit card reader unit being equipped to read credit card information in at least one of the magnetic stripe, chip card or RFID data formats; (f) a control circuit including a central processing unit in communication with said imaging assembly, said credit card reader, and said user interface, said control circuit being configured to operate in a mode in which said control circuit captures an electronic image representation and decodes a bar code represented in said captured image in response to said trigger being actuated, (g) a location determination circuit enabling said data collection device to receive location information indicating a present location of said data collection device; (h) wherein said device is configured to operate in a mode in which said control circuit alters display of information on said display in response to a present location of said device, as output by said location determination circuit; and (i) wherein said control circuit is configured to transmit decoded bar code message data to said remote server over a TCP/IP protocol stack; and (j) wherein said control circuit is further configured to wirelessly transmit credit account information determined by said credit card reader to a credit authorizing network via the public switched telephone network (PSTN).

A further object of the invention is to provide: (8) a bar code reading data collection device comprising: a hand held housing; (b) an imaging assembly supported by said hand held housing including at least one of (i) a combination of an image sensor and an imaging lens focusing an image onto an active surface of said solid state image sensor; and (ii) a laser scan engine; (c) a display disposed in said housing; (d) a user interface including a trigger and at least one of a touch screen and keyboard for entering data into said data collection device and for selecting between modes of operation of said device; (e) a control circuit communicatively coupled with said imaging assembly and said user interface, said control circuit being configured to operate in a mode in which said control circuit captures an electronic image representation and decodes a bar code symbol represented in said captured electronic image representation in response to receipt of a bar code reading trigger signal; (f) a location determination circuit enabling said data collection device to receive location information indicating a present location of said data collection device; (g) an RFID reader unit disposed on communication with said control circuit, said RFID reader unit having an RF oscillator and receiver circuit and a data decode circuit, wherein said control circuit operates said RF reader unit in a pair of user selectable operating modes, the pair of user-selectable operating modes being a continuous read mode, wherein said RFID reader unit continuously broadcasts a radio signal in an attempt to activate an RFID tag brought into proximity with said housing, and a selective activation mode in which said RFID reader unit is normally idle but is responsive to a trigger signal to drive said RFID reader unit into an active reading state, said RFID reader unit in said active reading state broadcasting a radio signal in an attempt to activate an RFID tag brought into proximity with said housing; (h) wherein said bar code reading data collection device is configured to operate in an operating mode in which said control circuit, with said RFID unit in said selective activation mode (i) monitors said location information received by said detection circuit; and (ii) generates a trigger signal to drive said RFID reader unit from an idle state to an active reading state if said location information coincides with predetermined location information.

A further object of the invention is to provide: (9) a bar code reading device data collection device for operation in a network having a remote server, said data collection device comprising: (a) a hand held housing; (b) an imaging assembly supported by said hand held housing including at least one of (i) a combination of an image sensor and an imaging lens focusing an image onto an active surface of said solid state image sensor; and (ii) a laser scan engine; (c) a display disposed in said housing; a location detecting unit incorporated into said hand held housing receiving signals from a series of orbiting satellites; (e) a user interface including a trigger and at least one of a touch screen and keyboard for entering data into said data collection device and for selecting between modes of operation of said device; (f) a control circuit in communication with said imaging assembly and said user interface, said control circuit being configured to operate in a mode in which said control circuit captures an electronic image representation and decodes a bar code symbol represented in said captured electronic image representation in response to said trigger being actuated, wherein said control circuit receives location information respecting a location of said device from at least one of said location detection unit and said network; and wherein said bar code reading data collection unit is configured to receive from said remote server route reports defining a schedule of delivery destinations for said device.

A further object of the invention is to provide: (10) a bar code data collection device for operation in a system including a plurality of networks and a remote server incorporated into one of said networks, for use in assisting record keeping associated with a delivery of an article from a supplier location to a delivery location, said data collection device comprising: a hand held housing; an article ID reading unit including at least one of an imaging assembly for capturing images for use in bar code decoding processing, and an RFID reader unit; a display disposed in said housing; a user interface including a trigger and at least one of a touch screen and keyboard for entering data into said data collection device and for selecting between modes of operation of said device; (a) a memory; (b) a control circuit in communication with said article ID reading unit, wherein said control circuit in response to receipt of a trigger signal activates said article ID unit and receives in response thereto article identification data wherein said bar code reading data collection device is configured so that said control circuit receives location information respecting a present location of said device, and wherein said bar code reading data collection device is configured to operate in a form assisted mode of operation in which said control circuit displays a data entry screen for assisting an operator in entering article identification data into said device; and (c) wherein said bar code reading data collection unit is configured to receive from said remote server information respecting a delivery destination of said device; (d) wherein said device is configured so that when operating in said form assisted data entry mode, said control circuit stamps a present location value on article identification data collected by data collection device when operating in said form assisted data collection mode of operation; and (e) wherein said device is configured to operate in a mode in which said device uploads to said remote server article identification data associated with said present location value so that a location of said device when collecting said article identification data can be extracted.

A further object of the invention is to provide: (11) a secure transaction system in support of data collection attendant to delivery of an article from a supplier facility to a delivery destination, said secure transaction system comprising: (a) a remote server storing route reports; (b) a portable data collection device having an imaging assembly and a control circuit and having an operating mode in which said portable data collection device collects at least one of decoded bar code data and decoded RFID tag identification data; (c) a higher security network coupling said remote server to said portable data collection device, said higher security network including a local area network at said supplier facility that is equipped with a tunneling module for encrypting data sent by said local area network to said remote server; (d) a lower security network coupling said remote server and said portable data collection device, said lower security network enabling encryption free payload data communication between said remote server and said portable data collection device; (e) said portable bar code reading device being configured such that data transmissions of said data collection device including certain secure identification data collected by said portable data collection device are disabled unless said portable data collection device requests sending of said certain secure identification data through said higher security network.

A further object of the invention is to provide: (12) a method for operating a data collection network comprising of a portable data collection device and a remote server, said portable data collection device having an identification unit comprising of at least one of a bar code reading unit and an RFID reader unit, said method comprising the steps of: (a) sending from said remote server to said portable data collection device route data including a location of a destination of said portable data collection device; (b) monitoring a present location of said portable data collection device; (c) comparing a current location of said portable data collection device to said destination location; (d) generating a trigger signal to actuate said identification unit if said current location of said device matches said destination; (e) decoding an encoded identification message utilizing said identification unit activated in step (d); and (f) outputting said decoded message decoded in step (e).

A further object of the invention is to provide: (13) a method for collecting data utilizing a portable data collection device operating in a system including a remote server, said method comprising the steps of: (a) reading at a delivery destination article identification information utilizing said portable data collection device; (b) further reading at said delivery destination a current location information data indicating a current location of said portable data collection device; (c) associating said article identification information with said current location information; and (d) wirelessly transmitting said associated article identification information and said current location information to said remote server through a virtual private network established between said portable data collection device and said remote server.

A further object of the invention is to provide: (14) a portable data collection device comprising: (a) an article identification unit including at least one of a bar code decoding system and an RFID reader module; (b) a display; (c) a user interface including a trigger for actuation of said article identification unit, said user interface further including at least one of a touch screen and a keyboard for manually entering in data and commands into said portable data collection device, wherein said article identification unit outputs a decoded out message; and (d) a radio frequency transceiver unit having a modulation scheme selection subunit, said radio frequency transceiver unit modulating a carrier wave in accordance with a modulation scheme to encode said decoded out message, wherein said modulation scheme selection subunit adaptively selects one out of a plurality of candidate modulation schemes in a manner responsive to present channel conditions as sensed by said radiofrequency transceiver, and wherein said radio transceiver is further configured to receive a quality of service (QOS) metric parameter.

A further object of the invention is to provide: (15) a portable data collection device operating in association with a data management system including a remote server, said portable data collection device comprising: (a) an article identification unit including at least one of a bar code decoding system and an RFID reader module; (b) a display; (c) a user interface including a trigger for actuation of said article identification unit, said user interface further including at least one of a touch screen and a keyboard for manually entering in data and commands into said portable data collection device, wherein said article identification unit outputs a decoded out message in response to receipt of a trigger signal; (d) a location determination circuit detecting a present location of said portable data collection device; (e) a signature collection unit generating an authorization signature image, said signature collection unit comprising at least one of said touch screen and an imaging assembly; (f) a transaction data processing module associating together, for a certain transaction, article identification data, signature data and location data; and (g) a transaction data upload module including an upload selection module enabling selection between a first transaction upload scheme and a second transaction data upload scheme, wherein said device when said first transaction data upload scheme is selected uploads said transaction data including associated article data, signature data and location data to said remote server in an image file format utilizing the file transfer protocol (FTP), and wherein said device when said second transaction data upload scheme is selected uploads said transaction data including associated article data, signature data and location data to said remote server utilizing an extensible markup language.

A further object of the invention is to provide: (16) a data collection system for implementation in an item delivery system wherein deliveries are made by delivery vehicles which travel along delivery routes that originate at a supplier facility, pass through one or more delivery locations and terminate at said supplier facility, said data collection system comprising: (a) a network disposed at said supplier facility, said network having an access point and an addressable printer in communication with said access point, said access point wirelessly transmitting a network identifier of said network; (b) a data collection device carried by said vehicle, said data collection device having an encoded information reading unit and incorporating a radio transceiver capable of communication with said access point; (c) a confirmation module included in said data collection device processing data to determine whether said data collection device is returning to said supplier facility; (d) wherein said data collection device is configured to automatically address a print command to said printer to automatically print data collected during execution of said route when receiving said network identifier from said network, provided that an output of said confirmation module indicates that said data collection device is returning to said supplier facility.

In addition, an object of the invention is to provide: the data collection system of (16), wherein said wirelessly transmitted network identifier of said network is selected from the group consisting of an SSID, a Cell ID and an IP address.

In addition, an object of the invention is to provide: the data collection system of (16), wherein said data collection device is configured to receive location information indicating a location of said data collection device, and wherein said data collection device, prior to automatically addressing said print command to said printer confirms that said data collection device is traveling in a direction toward said supplier facility utilizing said location information.

In addition, an object of the invention is to provide: the data collection device of (16), wherein said data collection data receives said location data from an on-board location data detection unit that is in communication with orbiting satellites.

In addition, an object of the invention is to provide: the data collection device of (16), wherein said data collection device receives said location data from a network.

A further object of the invention is to provide: (17) a data collection system comprising: (a) a local server; (b) a remote server communicatively coupled to said local server; (c) an access point wireline connected to said local server; (d) a mobile data collection device in communication with said access point, said mobile data collection device including an encoded information reader selected from the group consisting of a bar code reader unit and an RFID reader unit; (e) wherein said access point is configured to examine data packets received from said first and second mobile devices to determine whether a power save function has been selected and to buffer a data packet addressed to said mobile data collection device if said power save function is active; (f) wherein said mobile data collection has a mode of operation in which said mobile data collection device sends data to said remote server in response to an operator-initiated command; and (g) wherein said data collection system is configured so that in response to sending a location information request said mobile data collection device receives location information indicating a present location of said mobile data collection device within said system from said access point.

These and other details are described herein.

While the present invention has necessarily been described with reference to a number of specific embodiments, it will be understood that the time, spirit, and scope of the present invention should be determined only with reference to claims that can be supported by the written description and drawings.

We claim:

1. A data collection device comprising:
a hand held housing;
an imaging assembly supported by said hand held housing;
a central processing unit;
a memory;
a display disposed in said housing;
a user interface including at least one of a touch screen and a keyboard;
a wireless communication interface;
a location detecting unit including a radio transceiver, said location detecting unit incorporated into said hand held housing, said location detecting unit configured to output, based on radio signals received by said radio transceiver from at least three orbiting satellites, location data comprising a current location of said data collection device;
wherein said data collection device is configured to perform at least one of: receiving a network-based location information from a wireless network; determining a network-based location information based on a network identifier received from a wireless network;
wherein said data collection device is further configured to initiate communications with said at least three orbiting satellites based on said network-based location information;
wherein said data collection device is configured, responsive to a user interface action, to acquire an image, decode a bar code symbol represented in said image producing a decoded message, and associate said decoded message and said location data outputted by said location detecting unit; and
wherein said data collection device is further configured to transmit to a remote server said decoded message associated with said location data.

2. The data collection device of claim 1, wherein said imaging assembly includes at least one of: (i) a solid state image sensor and an imaging lens focusing an image onto an active surface of said solid state image sensor; and (ii) a laser scan engine.

3. The data collection device of claim 1, wherein said data collection device is further configured to operate in a picture taking mode of operation wherein said data collection device is configured to output said image without attempting to decode bar codes.

4. The data collection device of claim 1, wherein said data collection device is configured to decode at least one of 1D bar codes and 2D bar codes.

5. The data collection device of claim 1, further comprising at least one of: a USB interface, an RS/232 interface, and an Ethernet interface.

6. The data collection device of claim 1, wherein said wireless communication interface supports at least one of: an IEEE802.11-compliant communication protocol and an IEEE802.16-compliant communication protocol.

7. The data collection device of claim 1, wherein said wireless communication interface supports at least one of: GSM communication protocol and CDMA communication protocol.

8. The data collection device of claim 1, wherein said location data comprises a NMEA-compliant string.

9. The data collection device of claim 1, wherein said location data comprises a latitude and a longitude of said data collection device.

10. The data collection device of claim 1, wherein said data collection device is further configured to determine, based on said network-based location information, three or more satellites to receive signals from.

11. The data collection device of claim 1, wherein said wireless network is provided by one of: a cellular network, an IEEE802.11-compliant network, and an IEEE802.16-compliant network.

12. The data collection device of claim 1, wherein said location detecting unit is configured to output network-based location data responsive to failing to obtain valid satellite-based location data.

13. The data collection device of claim 1, wherein said location detecting unit is configured to output location data based on both network-based location information and satellite-based location information.

14. The data collection device of claim 1, wherein said data collection device is configured to store in said memory a network identifier of a wireless network in communication with said data collection device and said location data.

15. The data collection device of claim 1, wherein said data collection device is configured to execute a multitasking operating system.

* * * * *